United States Patent
Nakao

(10) Patent No.: US 9,891,753 B2
(45) Date of Patent: Feb. 13, 2018

(54) INPUT DEVICE, INPUT ASSISTANCE METHOD AND PROGRAM

(71) Applicant: PANASONIC INTELLECTUAL PROPERTY CORPORATION OF AMERICA, Torrance, CA (US)

(72) Inventor: Masatoshi Nakao, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/387,822

(22) Filed: Dec. 22, 2016

(65) Prior Publication Data

US 2017/0123592 A1 May 4, 2017

Related U.S. Application Data

(62) Division of application No. 14/236,097, filed as application No. PCT/JP2012/007026 on Nov. 1, 2012, now abandoned.

(30) Foreign Application Priority Data

Mar. 12, 2012 (JP) ................................. 2012-054920

(51) Int. Cl.
*G06F 3/041* (2006.01)
*G06F 3/0484* (2013.01)
(Continued)

(52) U.S. Cl.
CPC .......... *G06F 3/0418* (2013.01); *G06F 3/0488* (2013.01); *G06F 3/04842* (2013.01);
(Continued)

(58) Field of Classification Search
CPC ....... G06F 3/0418; G06F 3/045; G06F 3/0488
See application file for complete search history.

(56) References Cited

U.S. PATENT DOCUMENTS 8,421,752 B2* 4/2013 Deluca ............... G06F 3/011
178/18.01
9,019,210 B2* 4/2015 Qian ................ G06F 3/0236
345/173
(Continued)

FOREIGN PATENT DOCUMENTS

JP 08-212005 8/1996
JP 11-312264 11/1999
(Continued)

OTHER PUBLICATIONS

International Search Report and Written Opinion in PCT/JP2012/007026, dated Feb. 5, 2013, together with English translation of ISR.

*Primary Examiner* — Alexander Eisen
*Assistant Examiner* — Mansour M Said
(74) *Attorney, Agent, or Firm* — Greenblum & Bernstein, P.L.C.

(57) ABSTRACT

An input apparatus includes: a display; and a detector that detects contactless proximity of an object to the display at first coordinates of the object along a plane of the display, and contact of the object with the display at second coordinates of the object along the plane of the display. When the contactless proximity of the object is detected, and the first coordinates of the object are located within a first distance in the plane of the display from an item, the item is temporarily selected. After the item has been selected temporarily, when the contact of the object is detected, and the second coordinates of the object are located within a second distance in the plane of the display from the item, the item is finally selected. The second distance from the item is longer than the first distance from the item.

20 Claims, 15 Drawing Sheets

(51) Int. Cl.
    *G06F 3/0488*    (2013.01)
    *G06F 3/0481*    (2013.01)

(52) U.S. Cl.
    CPC ...... *G06F 3/04817* (2013.01); *G06F 3/04845* (2013.01); *G06F 2203/04108* (2013.01)

(56) References Cited

U.S. PATENT DOCUMENTS

| | | |
|---|---|---|
| 2009/0021387 A1 | 1/2009 | Hosono |
| 2010/0099464 A1* | 4/2010 | Kim ................ G06F 1/1615 455/566 |
| 2010/0302205 A1 | 12/2010 | Noma |
| 2011/0157040 A1 | 6/2011 | Kashio |
| 2011/0157045 A1 | 6/2011 | Miyazawa et al. |
| 2011/0316790 A1* | 12/2011 | Ollila ................ G06F 3/04883 345/173 |
| 2013/0311945 A1 | 11/2013 | Nakamoto |
| 2014/0184551 A1 | 7/2014 | Igarashi et al. |
| 2014/0192022 A1 | 7/2014 | Yamamoto |
| 2014/0253479 A1 | 9/2014 | Sato et al. |
| 2014/0267154 A1 | 9/2014 | Yamaguchi et al. |

FOREIGN PATENT DOCUMENTS

| | | |
|---|---|---|
| JP | 2002-342033 | 11/2002 |
| JP | 2003-280812 | 10/2003 |
| JP | 2008-47027 | 2/2008 |
| JP | 2009-026155 | 2/2009 |
| JP | 2011-134111 | 7/2011 |
| JP | 2011-134273 | 7/2011 |

\* cited by examiner

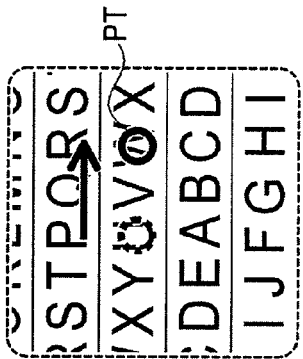
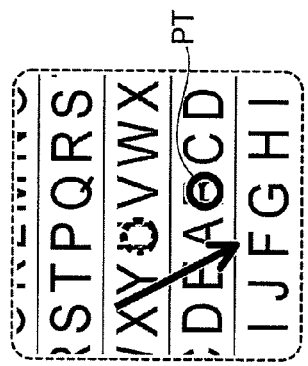
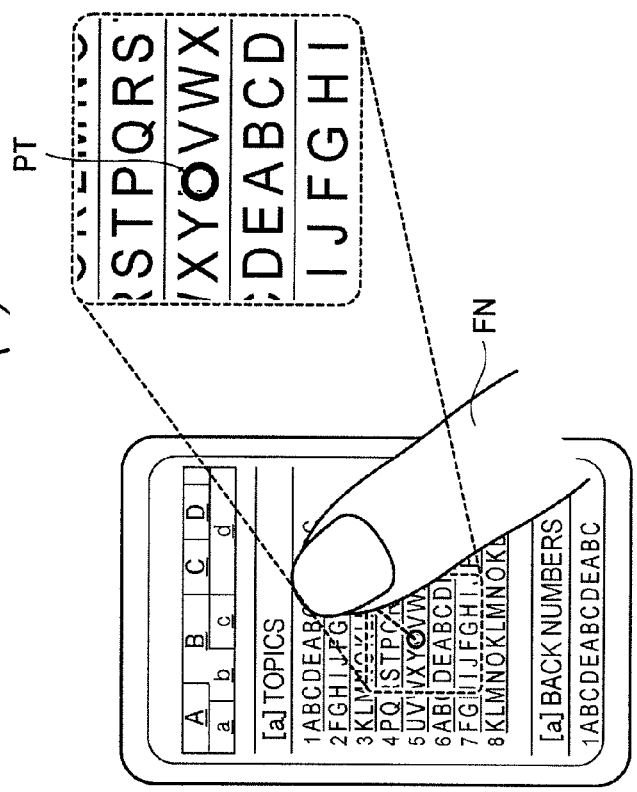

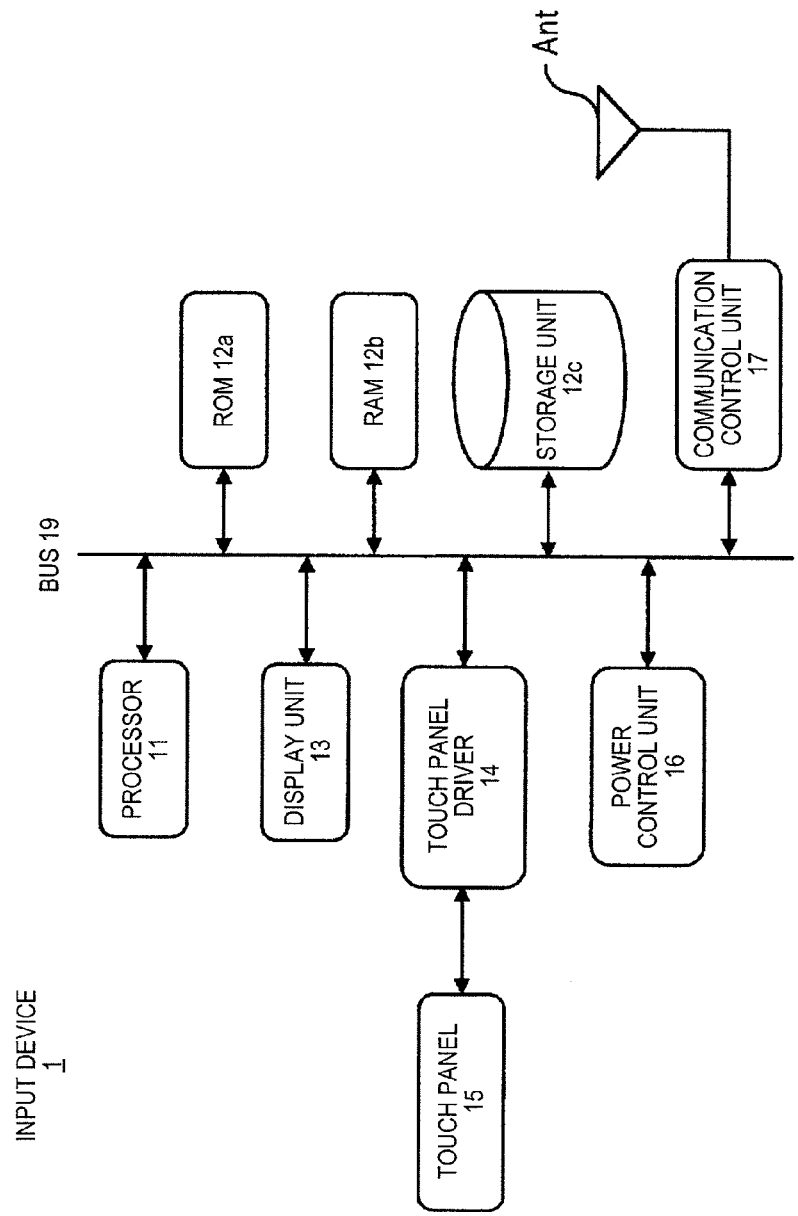

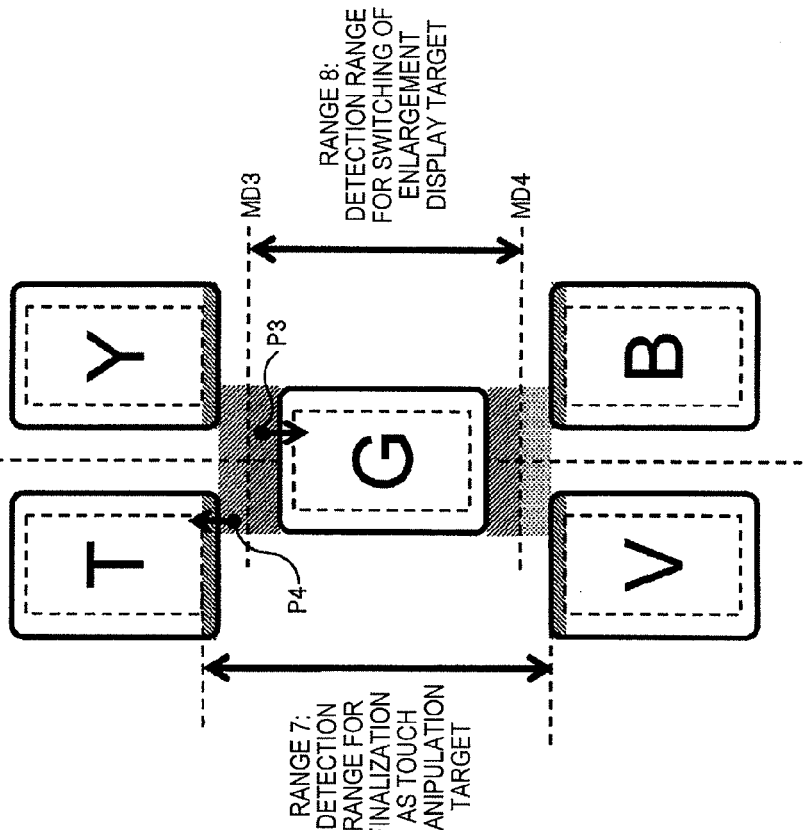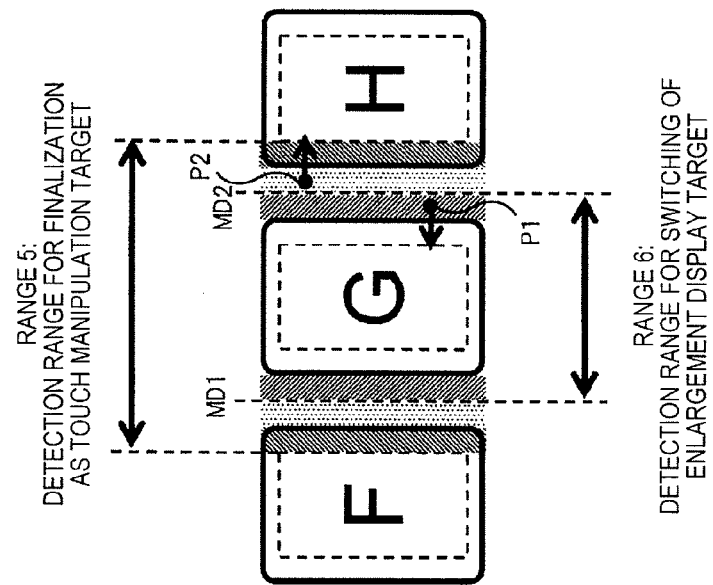

INPUT DEVICE, INPUT ASSISTANCE METHOD AND PROGRAM

CROSS-REFERENCE TO RELATED APPLICATIONS

This application is a divisional application of U.S. application Ser. No. 14/236,097, filed Jan. 30, 2014, which is a National Phase of PCT Patent Application No. PCT/JP2012/007026, filed on Nov. 1, 2013, which claims the benefit of Japanese Application No. 2012-054920, filed on Mar. 12, 2012, the disclosures of which are incorporated by reference herein in their entireties.

The present invention relates to an input device, an input assistance method, and a program for receiving input manipulations through a touch panel.

BACKGROUND ART

In recent years, touch panels which enable users to make intuitive manipulations have come to be used as devices for receiving input manipulations on electronic device including cellphones. Touch panels are known as devices which enable, through the same screen of an electronic device, an input manipulation on the screen and display processing for a processing result of the electronic device. It is an important issue how to fill the gap between the accuracy with which an electronic device can perform processing on a touch panel and the input accuracy that is expected by users.

The gap between the accuracy with which an electronic device can perform processing and the input accuracy expected by users will be described with reference to FIGS. 15(a) and 15(b). FIG. 15(a) shows lists of news headlines displayed on the screen of an electronic device incorporating a touch panel. FIG. 15(b) shows how characters are input through the screen of the electronic device incorporating the touch panel.

As shown in FIG. 15(a), the user can read the small characters of the news headlines displayed on the screen. However, when the user tries to push, as a button, the text of a hyperlinked news headline or input characters though a software keyboard shown in FIG. 15(b), the user may have difficulty pushing a desired button because of a large difference between the finger size and the size of the buttons displayed on the screen.

The technologies relating to touch panels are evolving year by year, and not only touch panels that detect a touch manipulation as a user input manipulation but also touch panels that detect coming into proximity of a user finger as a user input manipulation are being developed. For example, the non-contact user input device disclosed in Patent document 1 is known which relates to a touch panel for detecting coming into proximity of a finger.

The non-contact user input device disclosed in Patent document 1 is configured so as to include plural linear transmission electrodes, a transmitter for supplying transmission AC currents to the respective transmission electrodes, plural linear reception electrodes disposed so as not to be in contact with the transmission electrodes, and a receiver for receiving AC currents that flow through the respective reception electrodes. Capacitors are formed at the crossing points of the transmission electrodes and the reception electrodes and capacitors are formed as a fingertip of the user comes closer to a touch panel. Therefore, the capacitances of the capacitors vary according to the degree of proximity of the finger. The non-contact user input device can recognize the distance between the touch panel and the finger on the basis of variations of the capacitances.

RELATED ART DOCUMENTS

Patent Documents

Patent Document 1: JP-A-2002-342033

SUMMARY OF THE INVENTION

Problem to be Solved by the Invention

The above-described Patent Document 1 states that the distance between the touch panel and a finger can be recognized on the basis of variations of the capacitances. However, it is considered that Patent Document 1 does not address, in a specific manner, the issue of the gap between the accuracy with which an electronic device can perform processing and the input accuracy expected by users which has been described above with reference to FIGS. 15(a) and 15(b).

The issue of the above gap is thought to be unsolved in both of touch panels that detect a touch manipulation as a user input manipulation and touch panels that detect coming into proximity of a user finger as a user input manipulation.

The present invention has been made in the above circumstances of the related art, and an object of the invention is to provide an input device, an input assistance method, and a program for assisting efficient selection from items displayed on the screen in a touch manipulation receivable manner in response to a user input manipulation on a touch panel.

Means for Solving the Problem

The present invention provides an input device including: a display unit which displays data on a display screen; a touch panel which detects proximity of a finger to the display screen; a proximity coordinates extraction unit which extracts proximity coordinates of the proximity-detected finger with respect to the display screen; a display position calculation unit which calculates a position on the display screen under the proximity-detected finger in a vertical direction based on the extracted proximity coordinates; and a display control unit which displays an indicator indicating an item to become a touch manipulation target at the calculated position on the display screen.

The present invention provides an input device including: a display unit which displays data on a display screen; a touch panel which detects proximity of a finger to the display screen; a proximity coordinates extraction unit which extracts proximity coordinates of the proximity-detected finger with respect to the display screen; and a display control unit which enlarges, as a touch manipulation target item, based on the extracted proximity coordinates, an item that is displayed at a position on the display screen under the proximity-detected finger in a vertical direction.

The present invention provides a method for assisting input through a display screen, including: detecting proximity of a finger to the display screen; extracting proximity coordinates of the proximity-detected finger with respect to the display screen; calculating a position on the display screen under the proximity-detected finger in a vertical direction based on the extracted proximity coordinates; and displaying an indicator indicating an item to become a touch manipulation target at the calculated position on the display screen.

The present invention provides a method for assisting input through a display screen, including: detecting proximity of a finger to the display screen; extracting proximity coordinates of the proximity-detected finger with respect to the display screen; and enlarging, as a touch manipulation target item, based on the extracted proximity coordinates, an item displayed at a position on the display screen under the proximity-detected finger in a vertical direction.

The present invention provides a program for causing a computer including a display unit which displays data on a display screen to realize the steps of: detecting proximity of a finger to the display screen; extracting proximity coordinates of the proximity-detected finger with respect to the display screen; calculating a position on the display screen under the proximity-detected finger in a vertical direction based on the extracted proximity coordinates; and displaying an indicator indicating an item to become a touch manipulation target at the calculated position on the display screen.

The present invention provides a program for causing a computer including a display unit which displays data on a display screen to realize the steps of: detecting proximity of a finger to the display screen; extracting proximity coordinates of the proximity-detected finger with respect to the display screen; and enlarging, as a touch manipulation target item, based on the extracted proximity coordinates, an item displayed at a position on the display screen under the proximity-detected finger in a vertical direction.

With the above configuration, it is possible to assist efficient selection from items displayed on the screen in a touch manipulation receivable manner in response to a user input manipulation on a touch panel.

Advantages of the Invention

According to the present invention, it is possible to assist efficient selection from items displayed on the screen in a touch manipulation receivable manner in response to a user input manipulation on a touch panel.

BRIEF DESCRIPTION OF THE DRAWINGS

FIGS. 1(a) to 1(c) are explanatory diagrams outlining a first embodiment, in which FIG. 1(a) is an explanatory diagram showing how coming into proximity of a finger is detected and a pointer is displayed on a button that is displayed on the display screen, FIG. 1(b) is an explanatory diagram showing how the pointer is moved when the finger is moved rightward, and FIG. 1(c) is an explanatory diagram showing how the pointer is moved when the finger is moved in a bottom-right direction.

FIG. 2 is a block diagram showing a hardware configuration of an input device.

FIG. 12(a) is an explanatory diagram showing a detection range for finalization as a touch manipulation target and a detection range for switching of the enlargement target key in a case that keys are spaced from each other in the right-left direction, and FIG. 12(b) is an explanatory diagram showing a detection range for finalization as a touch manipulation target and a detection range for switching of the enlargement target key in a case that keys are spaced from each other in the top-bottom direction.

MODE FOR CARRYING OUT THE INVENTION

Figure 3:
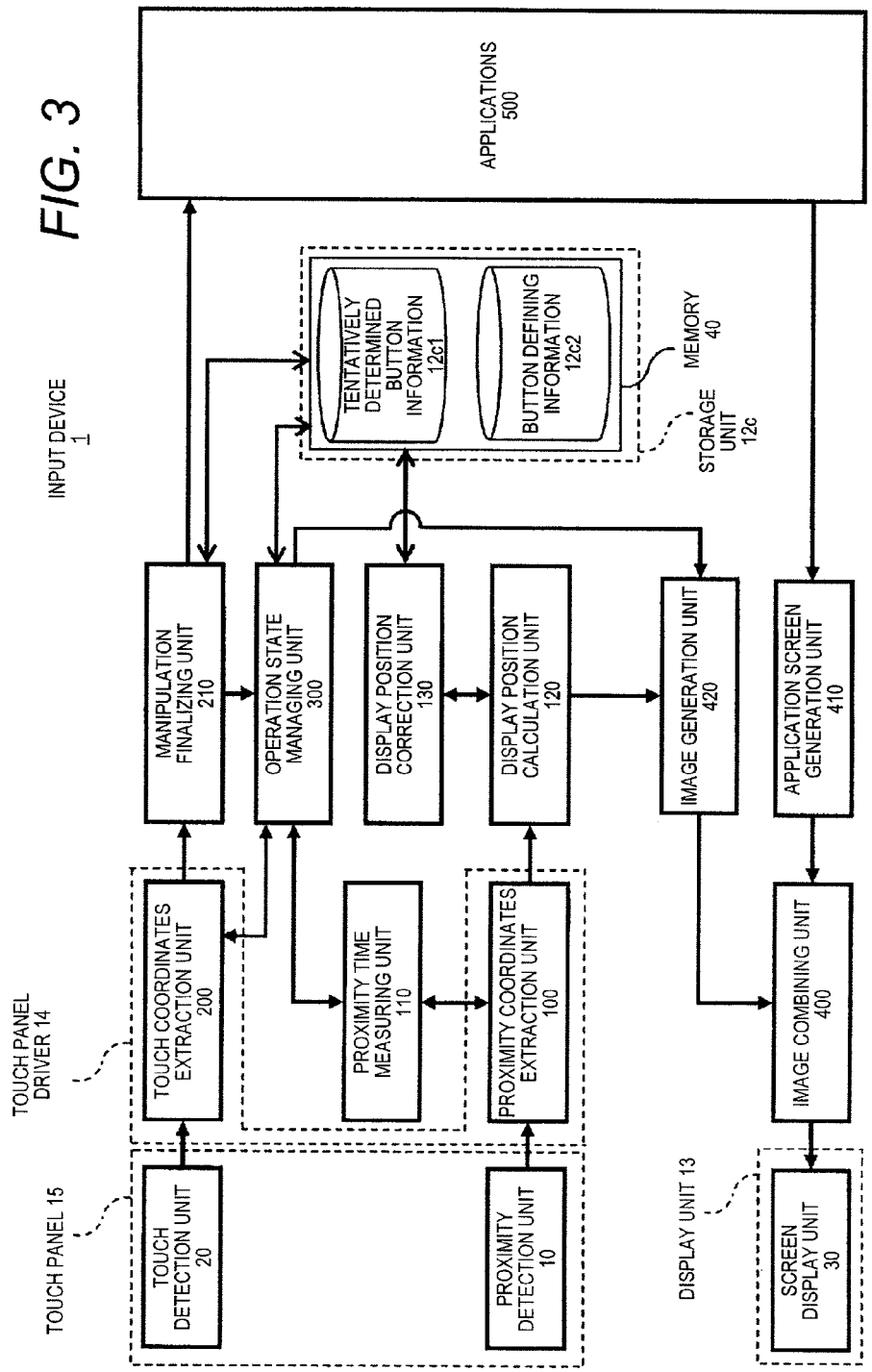
FIG. 3 is a block diagram showing a functional configuration of the input device.

Input device, input assistance methods, and programs according to embodiments of the present invention will be hereinafter described with reference to the drawings. The input device according to the invention encompasses electronic device incorporating a display unit for displaying data on the display screen, such as a cellphone, a smartphone, a tablet terminal, a digital still camera, a PDA (personal digital assistant), and an e-book terminal. Although the following description will be directed to a smartphone (input device according to the invention), the input device according to the invention is not limited to the kinds of electronic device mentioned above.

The invention can also be expressed as an input device as a product or a program for causing an input device to operate as a computer. Furthermore, the invention can also be expressed as an input assistance method including individual operations (steps) performed by an input device. That is, the invention can be expressed in any of the categories of an device, a method, and a program.

In the following description, the term "button" is defined as an item that enables reception of a user touch manipulation and selection of a portion of a content of each application displayed on the display screen (of an LCD (liquid crystal display), for example) of an input device or an item that enables activation of a prescribed process to be executed on a content. For example, the prescribed process is a process for displaying, as another picture, information relating to a content being displayed.

When news headlines, for example, are being displayed as an application content, a hyperlinked character string, that is, news headline, can be a "button." An image (e.g., icon or keyboard key) for urging a user to make a selection manipulation or a combination of a character string and an image can be a "button." "Buttons" are determined according to an application running on an input device.

The two axes that represent the horizontal surface of a touch panel are called x and y axes, and the axis that is vertical to the touch panel is called a z axis.

Furthermore, in the following description, it is assumed that the term "coordinates" includes coordinates (x, y) which are a combination of x and y coordinates and represent a position on the horizontal surface of the touch panel and coordinates (x, y, z) which a combination of the above coordinates (x, y) and a coordinate z which represents a distance between the touch panel and a finger in the vertical direction, that is, a height of the finger from the touch panel.

Furthermore, in the following description, a "hover manipulation" is defined as a manipulation of placing a finger at a spatial position that is spaced from the surface of a touch panel or sliding a finger from a spatial position that is spaced from the surface of a touch panel approximately parallel with the touch panel surface. Therefore, a manipulation that a finger directly touches the surface of a touch panel is a touch manipulation rather than a "hover manipulation." In a hover manipulation, it is preferable that the distance between a finger and a touch panel be in a distance range corresponding to a detectable capacitance range of the touch panel because the capacitance detected by the touch panel is inversely proportional to the distance.

Still further, in the following description, a "tentative determination" state is defined as a state that a button that will become a target touch manipulation when a user finger has been moved downward in the vertical direction of the touch panel of an input device is determined in advance and the user could be able to clearly recognize the button to become a touch manipulation target.

(Outline of Embodiment) 1

A first embodiment will be outlined with reference to FIG. 1. FIG. 1 is explanatory diagrams outlining the first embodiment. FIG. 1(a) is an explanatory diagram showing how coming into proximity of a finger is detected and a pointer is displayed on a button that is displayed on a display screen. FIG. 1(b) is an explanatory diagram showing how the pointer is moved when the finger is moved rightward. FIG. 1(c) is an explanatory diagram showing how the pointer is moved when the finger is moved in a bottom-right direction.

In the first embodiment, when detecting that a finger FN has come close to a touch panel 15 as a result of a hover manipulation of the user and the continuation time of the state that the finger FN is close to the touch panel 15 has exceeded a predetermined, prescribed time TM, an input device 1 displays a pointer PT as an indicator indicating a button that has been determined tentatively as a touch manipulation target at a position, located under the finger FN in the vertical direction, on a display screen DP (see FIG. 1(a)).

In this embodiment, the input device 1 displays a button that has been determined tentatively as a user touch manipulation target on the display screen DP using a pointer PT. Furthermore, when a tentatively determined button is actually touched by a user touch manipulation in a state that a pointer PT is displayed on the display screen DP, the tentatively determined button is finalized as a touch manipulation target and a process corresponding to the thus-finalized button is executed.

For example, in the example of FIG. 1(a), assume that the proximity state of the finger FN has been maintained for a time that is longer than the prescribed time TM, and that "U" of a hyperlinked character string of the fifth news headline of [a] topics is located at a position under the finger FN in the vertical direction on the display screen DP. The input device 1 displays a pointer PT at the position of "U" of the headline character string and thereby causes the user to recognize that this character string has been determined tentatively as a touch manipulation target.

If as shown in FIG. 1(b) the finger FN is moved rightward over the same button in a state that the pointer PT is displayed in such a manner that the button indicated by the pointer PT itself is clear, the pointer PT is moved continuously in the same button, that is, on the hyperlinked character string of the fifth news headline of the [a] topics. For example, in the example of FIG. 1(b), the pointer PT is moved from the position of "U" of the character string to the position of "W" of the character string.

If as shown in FIG. 1(c) the finger FN is moved from a position over a certain button to a position over another button (e.g., in a bottom-right direction) in a state that the pointer PT is displayed in such a manner that the button indicated by the pointer PT itself is clear, the pointer PT is moved continuously to another button rather than in the same button, that is, from the hyperlinked character string of the fifth news headline of the [a] topics to a hyperlinked character string of the sixth news headline of the same topics. For example, in the example of FIG. 1(c), the pointer PT is moved from the position of "U" of the character string to the position of "B" of the character string.

As described later with reference to FIG. 4, a pointer PT may be moved discretely rather than continuously. The discrete movement means that a pointer PT is jumped from a certain button to another button (adjacent button) past the boundary between them. For example, if the coordinates (x, y) located under a finger in the vertical direction are located between a certain button and another button, a pointer PT is not displayed at the middle position between the two buttons and, instead, is displayed so as to be moved discretely, that is, jumped directly from the certain button to the other button (see FIG. 4).

(Hardware Configuration of Input Device Common to Embodiments)

A hardware configuration of the input device 1 which is common to embodiments will be described with reference to FIG. 2. FIG. 2 is a block diagram showing a hardware configuration of the input device 1.

The input device 1 shown in FIG. 2 is configured so as to include a processor 11, a ROM (read-only memory) 12a, a RAM (random access memory) 12b, a storage unit 12c, a display unit 13, a touch panel driver 14, a touch panel 15, a power control unit 16, and a communication control unit 17 to which an antenna Ant is connected. The processor 11, the ROM 12a, the RAM 12b, the storage unit 12c, the display unit 13, the touch panel driver 14, the power control unit 16, and the communication control unit 17 are connected to each other via a bus 19 so as to be able to exchange data mutually.

The processor 11, which is formed using, for example, a CPU (central processing unit), an MPU (microprocessing unit), or a DSP (digital signal processor), performs an overall control of the input device 1 and various other kinds of computation processing and control processing. The processor 11 reads programs and data stored in the ROM 12a and performs various kinds of processing of each of the embodiments described below.

The ROM 12a is stored with applications 500 (see FIG. 3) which are installed in the input device 1 and the programs and data according to which the processor 11 performs various kinds of processing of individual units (described later) shown in FIG. 3.

The RAM 12b operates as a work memory for operation of the processor 11.

The storage unit 12c is formed using a hard disk or a flash memory incorporated in the input device 1 and stores data acquired by the input device 1. The applications 500 may be stored in the storage unit 12c. Instead of being formed using a hard disk or a flash memory, the storage unit 12c may be formed using, for example, an external storage medium (e.g., USB memory) that is connected via a USB (universal serial bus) terminal.

The display unit 13, which is formed using, for example, an LCD or an organic EL (electroluminescence) display having a display screen, displays data that is output from the processor 11 or the touch panel driver 14 on the display screen.

The touch panel driver 14 monitors a user input manipulation on the touch panel 15 by controlling the operation of the touch panel 15. For example, when the touch panel 15 has detected contact of a user finger as a result of a touch manipulation or coming into proximity of a user finger as a result of a hover manipulation, the touch panel driver 14 acquires contact coordinates (x, y) or proximity coordinates (x, y, z) and outputs the information of the coordinates (x, y) or proximity coordinates (x, y, z) to the processor 11, the RAM 12b, or the storage unit 12c. In the following, the contact coordinates (x, y) will be referred to as touch coordinates (x, y).

The touch panel 15 is mounted on the display screen of the display unit 13 and detects that a user finger has touched (manipulated) the horizontal surface of the touch panel 15. Furthermore, the touch panel 15 detects that a user finger has come close to the touch panel 15 as a result of a hover manipulation, that is, a manipulation of causing the finger to hover without touching the touch panel 15.

A specific configuration of the touch panel 15 will not be described because it is described in detail in Patent Document 1, for example. The touch panel 15 detects coming into proximity (or a proximity state) of a finger when the height (z coordinate value) of the finger under a hover manipulation is smaller than or equal to a prescribed value or the capacitance which depends on the height of the finger is larger than or equal to a prescribed value.

The power control unit 16, which is formed using a power supply source (e.g., battery) of the input device 1, switches between the power-on state and the power-off state of the input device 1 in response to an input manipulation on the touch panel 15. In the power-on state, the power control unit 16 supplies power to the individual units shown in FIG. 2 from the power supply source and thereby renders the input device 1 operational.

The communication control unit 17, which is formed using a wireless communication circuit, transmits data as a processing result of the processor 11 via the transmission/reception antenna Ant and receives, via the transmission/reception antenna Ant, data transmitted from a base station or another communication device (not shown). FIG. 2 shows the configuration that is necessary for the description of the embodiments including this embodiment; the input device 1 may further include an audio control unit for controlling a call voice, a microphone for picking up a user voice, and a speaker for outputting voice data of the other person on the phone.

(Functional Configuration of Input Device Common to Embodiments)

Next, a functional configuration of the input device 1 which is common to the embodiments will be described with reference to FIG. 3. FIG. 3 is a block diagram showing a functional configuration of the input device 1.

The input device 1 shown in FIG. 3 is configured so as to include a proximity detection unit 10, a touch detection unit 20, a screen display unit 30, a memory 40, a proximity coordinates extraction unit 100, a proximity time measuring unit 110, a display position calculation unit 120, a display position correction unit 130, a touch coordinates extraction unit 200, a manipulation finalizing unit 210, an operation state managing unit 300, an image combining unit 400, an application screen generation unit 410, an image generation unit 420, and the applications 500.

The proximity detection unit 10 detects that a user finger has come close to the touch panel 15 as a result of a hover manipulation. The proximity detection unit 10 outputs, to the proximity coordinates extraction unit 100, a proximity notice to the effect that the finger has come close to the touch panel 15.

The touch detection unit 20 detects that a finger has touched the touch panel 15 as a result of a touch manipulation. The touch detection unit 20 outputs, to the touch coordinates extraction unit 200, a contact notice to the effect that the finger has touched the touch panel 15. The proximity detection unit 10 and the touch detection unit 20 can be formed using the touch panel 15. Although in FIG. 3 the proximity detection unit 10 and the touch detection unit 20 are separate units, they may be formed together in the touch panel 15.

The screen display unit 30, which corresponds to the display unit 13 shown in FIG. 2, acquires, from the image combining unit 400, combined image data, generated by the image combining unit 400 described below, of a pointer PT and an application screen and displays it on the display screen.

The memory 40, which corresponds to the storage unit 12c shown in FIG. 2, stores at least tentatively determined button information 12c1 and button defining information 12c2. The tentatively determined button information 12c1 is information indicating a button that has been determined tentatively as a touch manipulation target among buttons in an application screen (described later) displayed on the display screen. In other words, the tentatively determined button information 12c1 is information indicating a button in which a pointer PT is displayed currently.

The button defining information 12c2 is information indicating sets of coordinates (x, y), on the display screen, of individual buttons in an application screen which is used by an application 500. Another configuration is possible in which the memory 40 corresponds to the RAM 12b shown in FIG. 2. In this case, coordinates or position-related information extracted or calculated by the proximity coordinates extraction unit 100, the display position calculation unit 120, or the touch coordinates extraction unit 200 (all described later) may also be stored in the memory 40. To avoid unduly complicating FIG. 3, arrows from the proximity coordinates extraction unit 100, the display position calculation unit 120, and the touch coordinates extraction unit 200 to the memory 40 are not drawn in FIG. 3.

The proximity coordinates extraction unit 100 outputs, to the proximity time measuring unit 110, a proximity notice that is output from the proximity detection unit 10, and calculates and extracts proximity coordinates (x, y, z) of a finger on the touch panel 15 on the basis of a proximity coordinates extraction instruction that is output from the proximity time measuring unit 110. The x and y components of the proximity coordinates (x, y, z) are coordinate values indicating a position on the horizontal surface of the touch panel 15 and the z component is a coordinate value indicating a distance between the finger and the touch panel 15, that is, a height of the finger with respect to the touch panel 15. The proximity coordinates extraction unit 100 outputs the information of the extracted proximity coordinates (x, y, z) to each of the proximity time measuring unit 110 and the display position calculation unit 120.

Having a clock (timer) function, the proximity time measuring unit 110 starts a time measurement in response to the proximity notice that is output from the proximity coordinates extraction unit 100. In other words, the proximity time measuring unit 110 measures (counts) an elapsed time from coming into proximity of the finger to the touch panel 15, that is, a continuation time of a finger proximity state. Furthermore, the proximity time measuring unit 110 judges whether or not the elapsed time from the coming into proximity of the finger to the touch panel 15 has become longer than a prescribed time TM.

If judging that the elapsed time from the coming into proximity of the finger to the touch panel 15 has become longer than the prescribed time TM, the proximity time measuring unit 110 generates a proximity coordinates extraction instruction for extraction of proximity coordinates (x, y, z) and outputs it to the proximity coordinates extraction unit 100 and outputs, to the operation state managing unit 300, a state transition notice to the effect that the input device 1 should make a transition to a "pointer display target selection state." Furthermore, the proximity time measuring unit 110 outputs, to the operation state managing unit 300, the information of proximity coordinates (x, y, z) that is output from the proximity coordinates extraction unit 100.

The term "pointer display target selection state" means a state that a finger is not in contact with the touch panel 15 and is close to the touch panel 15 as a result of a hover manipulation.

The display position calculation unit 120 calculates a position (x, y) on the touch panel 15 where to display a pointer PT on the basis of the information of the proximity coordinates (x, y, z) that is output from the proximity coordinates extraction unit 100. The position (x, y) on the touch panel 15 where to display a pointer PT corresponds to a position to be detected by the touch panel 15 when the finger is moved downward in the vertical direction, that is, a prearranged display position of a pointer PT.

At the same time as calculates a position (x, y) on the touch panel 15 where to display a pointer PT, the display position calculation unit 120 inquires of the display position correction unit 130 whether it is necessary to correct the display position of the pointer PT. In making this inquiry, the display position calculation unit 120 outputs the information of the calculated position (x, y) on the touch panel 15 to the display position correction unit 130 as the information of a prearranged display position of a pointer PT.

In response to the inquiry from the display position calculation unit 120, the display position correction unit 130 judges, by referring to the button defining information 12c2, whether or not a button is displayed within a prescribed distance of the position (x, y) on the touch panel 15 calculated by the display position calculation unit 120, that is, the prearranged display position of a pointer PT. The prescribed distance is a distance that is set to determine whether it is necessary to correct a prearranged display position of a pointer PT to allow a user to recognize that the prearranged display position of a pointer PT to indicate a tentatively determined touch manipulation target is clear. If judging that a button is displayed within the prescribed distance of the position (x, y) on the touch panel 15 calculated by the display position calculation unit 120, that is, the prearranged display position of a pointer PT, the display position correction unit 130 judges whether the prearranged display position of a pointer PT is a clear position that the user could easily judge visually or a position that is unclear to the user.

If judging that the prearranged display position of a pointer PT is a clear position that the user could easily judge visually, the display position correction unit 130 returns, as it is, to the display position calculation unit 120, the position (x, y) on the touch panel 15 calculated by the display position calculation unit 120, that is, the prearranged display position of a pointer PT. The display position calculation unit 120 tentatively determines, as a button to become a touch manipulation target, the button that is displayed at the prearranged display position of a pointer PT.

If judging that the prearranged display position of a pointer PT is an unclear position that the user would have difficulty judging it visually, the display position correction unit 130 corrects the position (x, y) on the touch panel 15 calculated by the display position calculation unit 120, that is, the prearranged display position of a pointer PT, by referring to the button defining information 12c2.

How the display position correction unit 130 corrects a prearranged display position of a pointer PT will be described with reference to FIG. 4 and FIGS. 5(a) and 5(b). FIG. 4 is an explanatory diagram showing how a prearranged display position of a pointer PT is corrected in the case where a position under a finger in the vertical direction is located between buttons or at an edge of a button. FIG. 5(a) is an explanatory diagram showing a positional relationship between a button and a correction zone that is set for the button. FIG. 5(b) is an explanatory diagram showing five example cases in which it is judged whether a prearranged display position of a pointer PT should be corrected or not.

Figure 4:
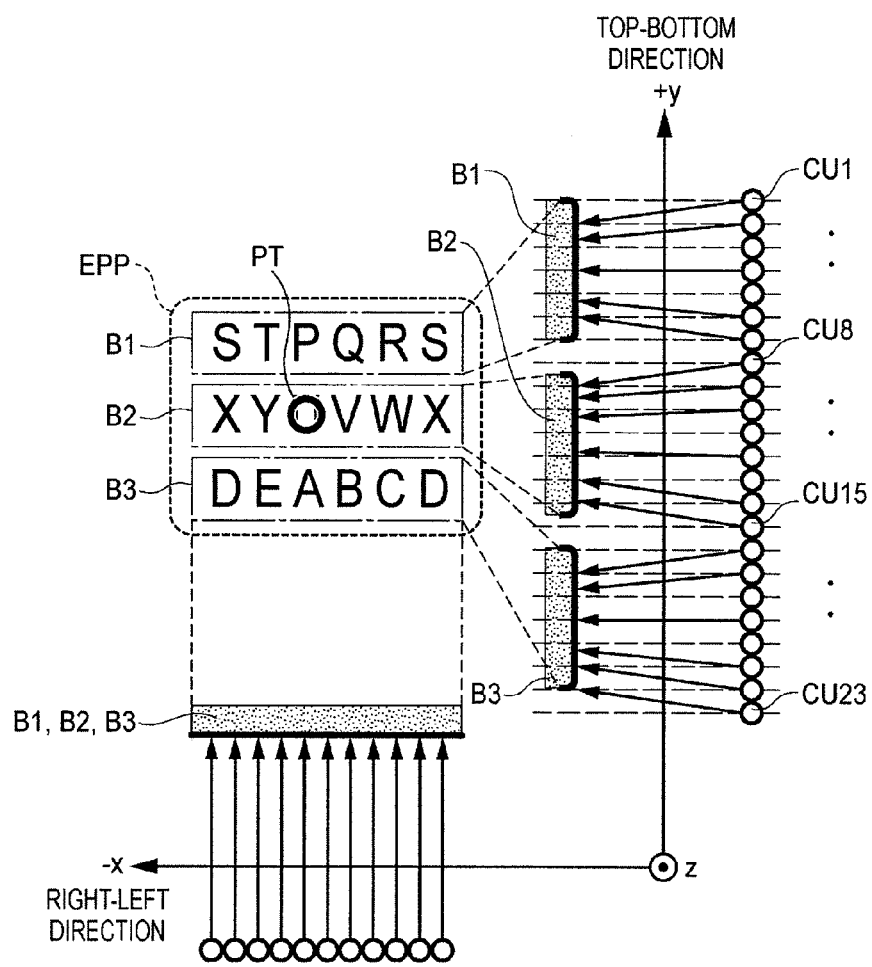
FIG. 4 is an explanatory diagram showing how a prearranged display position of a pointer PT is corrected in the case where a position under a finger in the vertical direction is located between buttons or at an edge of a button.
Figures 5A, 5B:
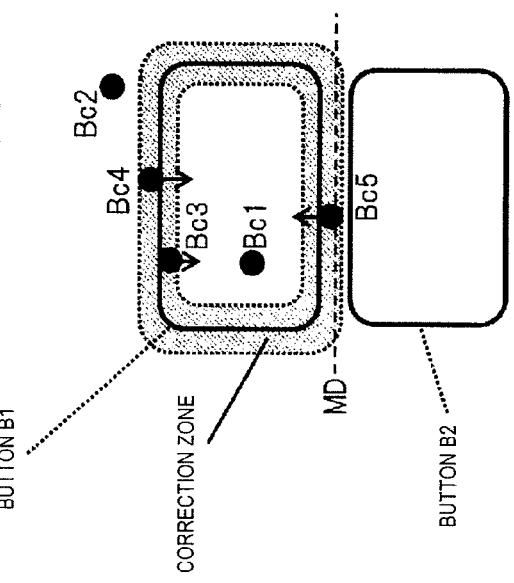
FIG. 5(a) is an explanatory diagram showing a positional relationship between a button and a correction zone that is set for the button.
FIG. 5(b) is an explanatory diagram showing five example cases in which it is judged whether a prearranged display position of a pointer PT should be corrected or not.

As shown in an enlarged part EDP of the display screen in FIG. 4, three buttons B1, B2, and B3 are arranged in the vertical direction so as extend parallel with each other. Therefore, a description will be made of correction of a prearranged display position of a pointer PT using the value of a coordinate y in the top-bottom direction rather than the value of a coordinate x in the right-left direction. Each of display positions CU1-CU23 correspond to detection positions, predetermined in the touch panel 15, of a coordinate y in the top-bottom direction and become a prearranged pointer display position if no correction is made by the display position correction unit 130. The interval between such prearranged display positions may be equal to either the distance between the electrodes of the touch panel 15 in the top-bottom direction or the distance between the pixels of the display screen.

As shown in FIG. 4, the display position CU1 corresponds to an edge of a button B1 and hence a pointer PT will be displayed at an edge position of the button B1 if no correction is made by the display position correction unit 130. If a pointer PT actually indicates an edge position of the button B1, it is unclear whether the pointer PT is located inside or outside the button B1. As a result, the user would have difficulty recognizing what button will be manipulated by touching the pointer PT and be rendered unable to decide whether to touch the pointer PT.

If the value of the coordinate y in the top-bottom direction between coordinates (x, y) on the touch panel 15 calculated by the display position calculation unit 120, that is, the coordinates of a prearranged display position of a pointer PT, corresponds to, for example, the display position CU1 shown in FIG. 4, the display position correction unit 130 corrects the value of the coordinate y to a coordinate value of, for example, an approximately central portion, in the top-bottom direction, of the button (in FIG. 4, button B1) corresponding to the display position CU1. However, the value of the coordinate y need not always be corrected to a coordinate value of an approximately central portion, in the top-bottom direction, of the button (in FIG. 4, button B1) corresponding to the display position CU1; the value of the coordinate y may be corrected to the coordinate value of a position that is near an edge of the button B1 as long as the user could recognize that the actual display position of a pointer PT is inside the button B1. With this measure, since the display position correction unit 130 can display a pointer PT at an approximately central portion of the button B1, the user is allowed to clearly recognize what button is a target of an intended touch manipulation.

In the example of FIG. 4, since the display position CU8 corresponds to a middle position between the buttons B1 and B2, if no correction is made by the display position correction unit 130, it is unclear whether the button for which a pointer PT is displayed is the button B1 or the button B2 or neither of them. The user would therefore feel uncomfortable.

If the value of the coordinate y in the top-bottom direction between coordinates (x, y) on the touch panel 15 calculated by the display position calculation unit 120, that is, the coordinates of a prearranged display position of a pointer PT, corresponds to, for example, the display position CU8 shown in FIG. 4, the display position correction unit 130 corrects the value of the coordinate y to a coordinate value of, for example, an approximately central portion, in the top-bottom direction, of a button (in FIG. 4, button B2) that is closest to the display position CU8. However, the value of the coordinate y need not always be corrected to a coordinate value of an approximately central portion, in the top-bottom direction, of the button (in FIG. 4, button B2) corresponding to the display position CU8; the value of the coordinate y may be corrected to the coordinate value of a position that is near an edge of the button B2 as long as the user could recognize that the actual display position of a pointer PT is inside the button B2. With this measure, since the display position correction unit 130 can display a pointer PT at an approximately central portion of the button B2, the user is allowed to clearly recognize what button is a target of an intended touch manipulation.

In the example of FIG. 4, since the display position CU15 corresponds to a middle position between the buttons B2 and B3, if no correction is made by the display position correction unit 130, it is unclear whether the button for which a pointer PT is displayed is the button B2 or the button B3 or neither of them. The user would therefore feel uncomfortable.

If the value of the coordinate y in the top-bottom direction between coordinates (x, y) on the touch panel 15 calculated by the display position calculation unit 120, that is, the coordinates of a prearranged display position of a pointer PT, corresponds to, for example, the display position CU15 shown in FIG. 4, the display position correction unit 130 corrects the value of the coordinate y to a coordinate value of, for example, an approximately central portion, in the top-bottom direction, of a button (in FIG. 4, button B2) that is closest to the display position CU15. However, the value of the coordinate y need not always be corrected to a coordinate value of an approximately central portion, in the top-bottom direction, of the button (in FIG. 4, button B3) corresponding to the display position CU15; the value of the coordinate y may be corrected to the coordinate value of a position that is near an edge of the button B3 as long as the user could recognize that the actual display position of a pointer PT is inside the button B3. With this measure, since the display position correction unit 130 can display a pointer PT at an approximately central portion of the button B2, the user is allowed to clearly recognize what button is a target of an intended touch manipulation.

In FIG. 4, solid-line arrows from the respective display positions located two and four intervals under the display position CU1, the display position located three intervals under the display position CU8, and the respective display positions located three and five intervals under the display position CU15 to the corresponding buttons are not shown. This is intentional because the user could clearly judge the display position of a pointer PT even if the pointer PT is actually displayed at each of the above display positions.

Next, how the display position correction unit 130 corrects a display position of a pointer PT will be described with reference to FIGS. 5(*a*) and 5(*b*). FIG. 5(*a*) shows an example in which a button B1 (above) and a button B2 (below) are displayed adjacent to each other. FIG. 5(*a*) shows a correction zone (hatched) of the button B1. A correction zone is assigned to each button and has a width (see the hatching) of about 1 mm, for example, as measured from the edge of the associated button, which also applies to the following embodiment. However, the width of the correction zone is not limited to 1 mm. The width of the correction zone may vary from one button to another, and widths of correction zones are stored as part of the button defining information 12*c*2 so as to be correlated with respective buttons.

As for whether the display position correction unit 130 should correct a prearranged display position of a pointer PT, five cases Bc1, Bc2, Bc3, Bc4, and Bc5, for example, are conceivable one of which is satisfied by the prearranged display position of a pointer PT. FIG. 5(*a*) shows prearranged display positions of a pointer PT which correspond to the five respective cases. FIG. 5(*b*) shows, for each case, whether or not the display position correction unit 130 should correct a prearranged display position of a pointer PT and whether or not the display position calculation unit 120 should tentatively determine the button concerned as a touch manipulation target button.

In the first case Bc1, since the prearranged display position of a pointer PT is apparently inside the button B1, an actually displayed pointer PT would clearly indicate the button B1. Therefore, the display position correction unit 130 does not perform correction and the display position calculation unit 120 makes tentative determination.

In the second case Bc2, since the prearranged display position of a pointer PT is apparently outside the button B1, it is apparent that the button B1 does not exist within a prescribed distance of the prearranged display position of a pointer PT. Therefore, the display position correction unit 130 does not perform correction and the display position calculation unit 120 does not make tentative determination.

In the third case Bc3, since the prearranged display position of a pointer PT is inside the button B1 and the correction zone, an actually displayed pointer PT will be close to the edge of the button B1 and hence require position correction for allowing the user to clearly recognize that the button B1 is a touch manipulation target. Therefore, in the case Bc3, the display position correction unit 130 corrects the prearranged display position of a pointer PT inward in the button B1 and the display position calculation unit 120 makes tentative determination.

In the fourth case Bc4, since the prearranged display position of a pointer PT is outside the button B1 and inside the correction zone and no adjacent button exist, an actually displayed pointer PT will be outside the button B1 but close to the edge of the button B1 and it will be necessary to cause the user to clearly recognize that the closest button B1 is a touch manipulation target. Therefore, in the case Bc4, the display position correction unit 130 corrects the prearranged display position of a pointer PT inward in the button B1 and the display position calculation unit 120 tentatively employs the button B1 as a touch manipulation target.

In the fifth case Bc5, since the prearranged display position of a pointer PT is outside the button B1 and inside the correction zone and an adjacent button B2 exists, when a pointer PT is actually displayed, it would be unclear whether the button the user intends to touch-manipulate is the button B1 or the button B2. Therefore, in the case Bc5, the display position correction unit 130 corrects the prearranged display position of a pointer PT so that it will be located inside the button B1 and the display position calculation unit 120 tentatively employs the button B1 as a touch manipulation target.

The touch coordinates extraction unit 200 outputs, to the operation state managing unit 300, a contact notice that is output from the touch detection unit 20. And the touch coordinates extraction unit 200 calculates and extracts touch coordinates (x, y) of a finger on the touch panel 15 on the basis of the contact notice that is output from the touch detection unit 20. The touch coordinates extraction unit 200 outputs the information of the extracted touch coordinates (x, y) to the manipulation finalizing unit 210.

Upon acquiring the information of the touch coordinates (x, y) that is output from the touch coordinates extraction unit 200, the manipulation finalizing unit 210 inquires of the operation state managing unit 300 whether or not a pointer PT is already displayed in the input device 1. If receiving, from the operation state managing unit 300, a pointer display notice to the effect that a pointer PT is already displayed, the touch coordinates extraction unit 200 judges whether or not the touch coordinates (x, y) are within a detection range (see FIG. 6) of the button that is tentatively determined to be a touch manipulation target.

Furthermore, if judging that the touch coordinates (x, y) are within the detection range (see FIG. 6) of the button that is tentatively determined to be a touch manipulation target, the manipulation finalizing unit 210 judges whether or not a touch manipulation with a quick downward movement of a finger in the vertical direction has been made on a button that is different from the button on which the pointer PT is displayed.

In each of the embodiments including this embodiment, a prescribed threshold value (e.g., 50 μF) is set in advance for a variation amount of a capacitance detected by the touch panel 15. The "quick downward movement of a finger in the vertical direction" is, for example, a movement that changes the capacitance from 100 μF to 200 μF in a prescribed time (e.g., 100 msec), that is, a movement of a touch manipulation that causes a capacitance variation amount that exceeds the threshold value.

Figure 6:
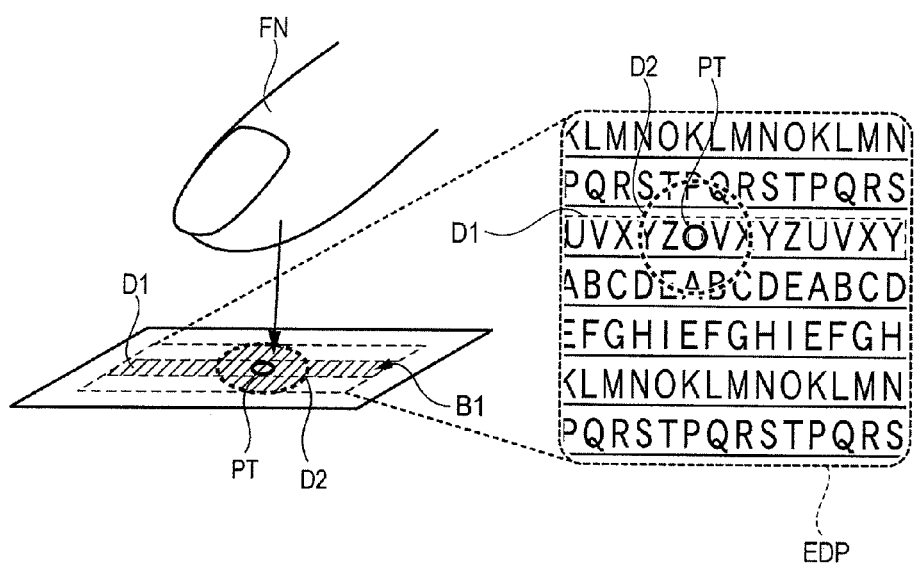
FIG. 6 is an explanatory diagram showing a detection range of a button that is tentatively determined to be a touch manipulation target in a state that a pointer is displayed.

The detection range of a button that is tentatively determined to be a touch manipulation target will be described with reference to FIG. 6. FIG. 6 is an explanatory diagram showing a detection range of a button that is tentatively determined to be a touch manipulation target in a state that a pointer PT is displayed.

As shown in an enlarged part EDP of the display screen in FIG. 6, in the conventional technique, the detection range, for a touch manipulation, of a hyperlinked character string of a news headline in which a pointer PT is displayed is a detection range D1 (i.e., the range of a button B1).

In each of the embodiments including this embodiment, the detection range, for a touch manipulation, of a hyperlinked character string of a news headline in which a pointer PT is displayed includes not only the detection range D1 but also a detection range D2. That is, the detection range, for a touch manipulation, of the character string of a news headline in which a pointer PT is displayed is enlarged. The detection range D2 has a size that allows the user to make a touch manipulation easily. With this measure, the manipulation finalizing unit 210 can judge that a touch manipulation made in the detection range D2 as a touch manipulation on the button on which the pointer PT has been displayed even if the button that is tentatively determined to be a user touch manipulation target is such a small button as to render a touch manipulation difficult.

The shape and the range (coordinate value ranges) of the detection range D2 are prescribed in advance as fixed values as part of the operation particulars of the manipulation finalizing unit 210 or the button defining information 12c2. In the example of FIG. 6, the detection range D2 has a circular shape. However, the shape of the detection range D2 is not limited to a circle and may be, for example, an ellipse or a rectangle. Therefore, if a touch-manipulated position on the touch panel 15 is within the detection range D2, the manipulation finalizing unit 210 judges that the button on which the pointer PT has been displayed as a touch manipulation target should be selected.

Although the statement to the effect that the detection range D2 is prescribed as fixed values as part of the operation particulars of the manipulation finalizing unit 210 was made above, the detection range D2 is not restricted so as to be set as fixed values. For example, where a character string displayed on the display screen DP is large enough for a user touch manipulation, an erroneous touch manipulation can well be prevented even if the detection range D2 is small or even absent (i.e., only with the detection range D1 (button B1)).

On the other hand, where a character string displayed on the display screen DP is small, if the detection range D2 is set as fixed values, an erroneous touch manipulation may occur even if the detection range for the button B1 is enlarged by the detection range D2. Therefore, the manipulation finalizing unit 210 may vary the detection range D2 dynamically according to the size of a character string (button B1) displayed on the display screen DP. This allows the manipulation finalizing unit 210 to prevent an erroneous touch manipulation on a character string (button B1) displayed on the display screen DP and thereby allows the user to make a manipulation more comfortably.

Figure 7:
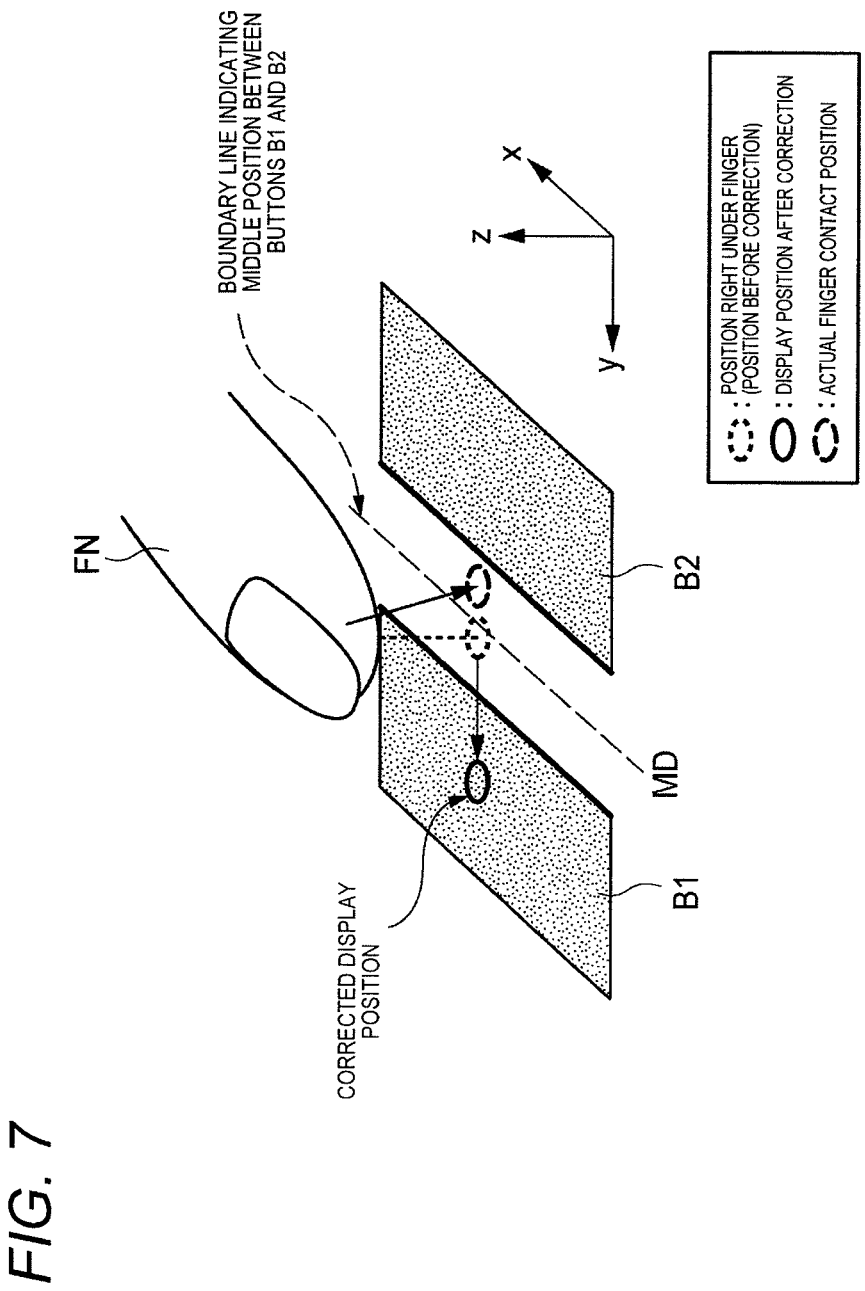
FIG. 7 is an explanatory diagram showing how the button on which a pointer has been displayed is selected as a touch manipulation target button when a touch manipulation with a quick downward movement of a finger in the vertical direction has been made on a button that is different from the button on which the pointer is displayed.

Next, how to judge whether or not a touch manipulation with a quick downward movement of a finger in the vertical direction has been made on a button that is different from the button on which a pointer PT is displayed will be described with reference to FIG. 7. FIG. 7 is an explanatory diagram showing how the button on which a pointer PT has been displayed is selected as a touch manipulation target button when a touch manipulation with a quick downward movement of a finger FN in the vertical direction has been made on a button that is different from the button on which the pointer PT is displayed.

In the example of FIG. 7, the position on the touch panel 15 under the finger FN in the vertical direction is located on the button B1 side of a boundary line MD indicating the middle position between the button B1 and a button B2. Therefore, the display position correction unit 130 corrects the prearranged display position of the pointer PT from the position on the touch panel 15 under the finger FN in the vertical direction to an approximately central portion of the button B1 (see FIG. 4).

Now assume that a touch manipulation with a quick downward movement of a finger FN in the vertical direction has been made so as to select the button B2 that is different from the button B1 on which the pointer PT is displayed. For example, this corresponds to a case that the user attempts to make a touch manipulation of touching the button B1 but his or her finger ends up touching a point that is close to the button B2 past the boundary line MD which indicates the middle position between the buttons B1 and B2. FIG. 7 shows that this touch manipulation is a touch manipulation in which the finger FN is moved from the position of the proximity coordinates to a position located on the button B2 side of the boundary line MD (indicated by a solid-line arrow originating from the finger FN).

Since the touch coordinates of this touch manipulation (indicated by the solid-line arrow originating from the finger FN) are located between the buttons B1 and B2 rather than on the button B2, this touch manipulation is of such a nature that according to the conventional technique it should be judged an invalid touch manipulation. In each of the embodiment including this embodiment, as shown in FIG. 4 the button B2 is finalized as a touch manipulation target because the value of the y coordinate of the touch coordinates is close to the button B2 than the button B1. Therefore, it can be said that the touch manipulation shown in FIG. 7 (indicated by the solid-line arrow originating from the finger FN) is a touch manipulation of selecting the button B2 rather than the button B1 on which the pointer PT is displayed because of a quick downward movement of the finger FN in the vertical direction.

Therefore, when a touch manipulation of selecting the button B2 rather than the button B1 on which the pointer PT is displayed because of a quick downward movement of the finger FN in the vertical direction has been made, the manipulation finalizing unit 210 judges that the button B1 on which the pointer PT has been displayed should be selected preferentially as a touch manipulation target rather than the button B2 to which the prearranged display position would otherwise be corrected according to the point actually touched by the finger FN.

Furthermore, the manipulation finalizing unit 210 judges whether or not a button for activating (executing) a prescribed process is located at coordinates (x, y) where the touch panel 15 has been touched by the finger on the basis of the touch coordinates (x, y) that are output from the touch coordinates extraction unit 200. If judging that a button for activating (executing) a prescribed process is located at the coordinates (x, y) where the touch panel 15 has been touched by the finger, the manipulation finalizing unit 210 finalizes the button displayed at the position of the touch coordinates (x, y) as a touch manipulation target.

The manipulation finalizing unit 210 outputs information relating to the button that has been finalized as a touch manipulation target and the information of the touch coordinates (x, y) to the application 500.

When acquiring, from the proximity time measuring unit 110, a state transition notice to the effect that the input device 1 should make a transition to a "pointer display target selection state," the operation state managing unit 300 changes the operation state of the input device 1 to the "pointer display target selection state." The operation state managing unit 300 temporarily stores the information relating to the operation state of the input device 1 and the information of proximity coordinates (x, y, z) in the memory 40 or the RAM 12b and outputs, to the image generation unit 420, a pointer generation instruction to the effect that image data a pointer PT should be generated.

When acquiring a contact notice that is output from the touch coordinates extraction unit 200, the operation state managing unit 300 causes the input device 1 to make a transition from the "pointer display target selection state" to a "touch-manipulation-induced manipulation finalization state." The operation state managing unit 300 temporarily stores the information relating to the operation state of the input device 1 and the information of touch coordinates (x, y) in the memory 40 or the RAM 12b.

The operation state managing unit 300 judges whether or not the information indicating the operation state of the input device 1 indicates the "pointer display target selection state" by referring to the memory 40 in response to an operation state check request that is output from the manipulation finalizing unit 210. The operation state managing unit 300 outputs a judgment result, that is, information relating to the operation state of the input device 1, to the manipulation finalizing unit 210.

The image combining unit 400 (display control unit) combines screen data of an application screen that is output from the application screen generation unit 410 with image data of a pointer PT that is output from the image generation unit 420. The image combining unit 400 displays thus-generated combined image data on the display screen of the screen display unit 30. The image combining unit 400, the application screen generation unit 410, and the image generation unit 420 may constitute a display control unit.

The application screen generation unit 410 generates screen data of an application screen of the application 500 on the basis of a screen generation notice received from the application 500 and outputs it to the image combining unit 400. Although in FIG. 3 the application screen generation unit 410 and the applications 500 are drawn as separate units, they may be combined together into new applications 500 by giving the functions of the application screen generation unit 410 to the applications 500.

The image generation unit 420 generates image data of a pointer PT as an indicator on the basis of a pointer generation instruction received from the operation state managing unit 300, and outputs the generated image data of a pointer PT to the image combining unit 400. This indicator is a manipulation-assisting item indicating a touch manipulation target item (button). Although the pointer PT has a circular shape in FIG. 4, the shape of the pointer PT is not limited to a circle and may be, for example, a rectangle or an ellipse.

Furthermore, although the size of the pointer PT is prescribed in advance as a fixed value as part of the operation particulars of the image generation unit 420, it is not limited to a fixed value. The image generation unit 420 may vary the size of the pointer PT by referring to the information of proximity coordinates (x, y, z) that are temporarily stored in the memory 40 or the RAM 12b by the operation state managing unit 300 and the button defining information 12c2. This allows the image generation unit 420 to generate a pointer PT that is suitable for the size of a button and thereby prevents the user from feeling uncomfortable visually. For example, the size of the pointer PT may be as small as one point on the display screen as in the case of a mouse which is an input device connected to a personal computer (PC). Thus, the size of the pointer PT may be either the same as or smaller than that of, for example, a character string constituting a tentatively determined button.

The application 500, which was installed in advance so as to be executable by the input device 1, determines an operation (process) of itself according to a selected button on the basis of the information of the button and the information of touch coordinates (x, y) that are output from the manipulation finalizing unit 210. The application 500 outputs, to the application screen generation unit 410, a screen generation notice that instructs it to generate screen data corresponding to the determined operation.

(Flowchart of Embodiment) 1

Figure 8:
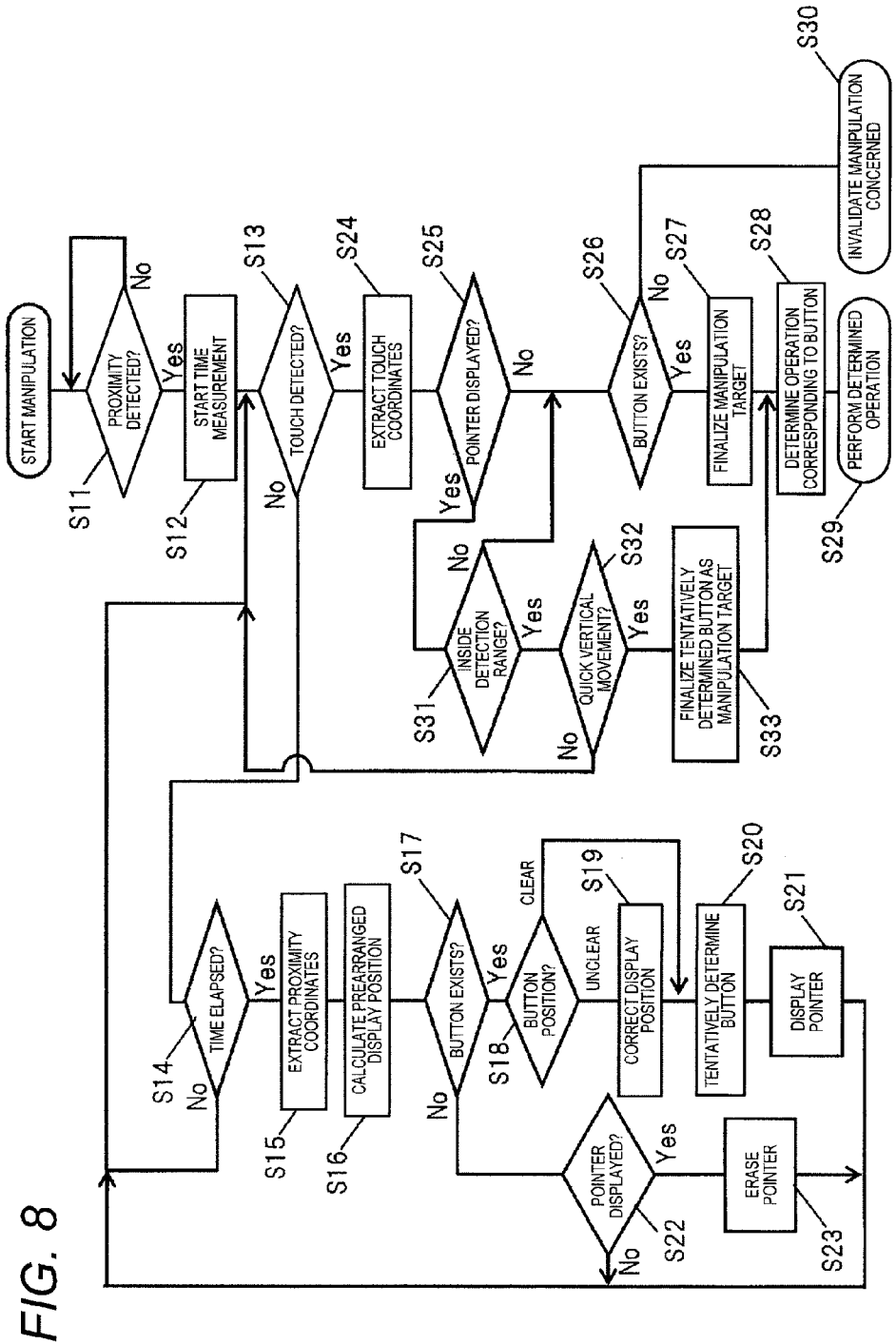
FIG. 8 is a flowchart showing how the input device according to the first embodiment operates.

Next, how the input device 1 according to the first embodiment operates will be described with reference to FIG. 8. FIG. 8 is a flowchart showing how the input device 1 according to the first embodiment operates. The flowchart of FIG. 8 shows how the input device 1 operates when a user who manipulates the input device 1 inputs a manipulation on the input device 1 using his or her own finger.

First, the proximity detection unit 10 detects whether or not a user finger has come close to the touch panel 15 as a result of a hover manipulation (S11). If detecting that a finger has come close to the touch panel 15 (S11: yes), the proximity detection unit 10 outputs, to the proximity coordinates extraction unit 100, a proximity notice to the effect that a finger has come close to the touch panel 15. The proximity coordinates extraction unit 100 outputs, to the proximity time measuring unit 110, the proximity notice that is output from the proximity detection unit 10.

The proximity time measuring unit 110 measures (counts) an elapsed time from the coming into proximity of the finger to the touch panel 15, that is, a continuation time of the finger proximity state (S12) in response to a contact notice which has been output from the proximity coordinates extraction 100. The touch detection unit 20 detects whether or not a finger has touched the touch panel 15 (touch manipulation). The proximity time measuring unit 110 inquires of the operation state managing unit 300 whether or not a contact notice indicating that the touch panel 15 has been touched by a finger has been output from the touch coordinates extraction unit 200 to the operation state managing unit 300 (S13). The operation state managing unit 300 judges, by referring to the memory 40 or the RAM 12b, whether or not it has acquired a contact notice indicating that the touch panel 15 has been touched by a finger, and outputs a judgment result to the proximity time measuring unit 110.

For convenience of description, it is assumed here that the operation state managing unit 300 has not acquired, from the touch coordinates extraction unit 200, a contact notice indicating that the touch panel 15 has been touched by a finger (S13: no). That is, the proximity time measuring unit 110 acquires, from the operation state managing unit 300, a judgment result to the effect that it has not acquired, from the touch coordinates extraction unit 200, a contact notice indicating that the touch panel 15 has been touched by a finger. The proximity time measuring unit 110 judges whether or not the elapsed time from the coming into proximity of the finger to the touch panel 15 is longer than a prescribed time TM (S14). If it is judged that the elapsed time from the coming into proximity of the finger to the touch panel 15 is not longer than the prescribed time TM (S14: no), the process of the input device 1 returns to step S13.

If judging that the elapsed time from the coming into proximity of the finger to the touch panel 15 is longer than the prescribed time TM (S14: yes), the proximity time measuring unit 110 generates a proximity coordinates extraction instruction to extract proximity coordinates (x, y, z) and outputs it to the proximity coordinates extraction unit 100. And the proximity time measuring unit 110 outputs, to the operation state managing unit 300, a state transition notice to the effect that a transition to a "pointer display target selection state" of the input device 1 should be made. The operation state managing unit 300 changes the operation state of the input device 1 to the "pointer display target selection state."

The proximity coordinates extraction unit 100 calculates and extracts proximity coordinates (x, y, z) of the finger on (with respect to) the touch panel 15 in response to the proximity coordinates extraction instruction that is output from the proximity time measuring unit 110 (S15). The proximity coordinates extraction unit 100 outputs the information of the extracted proximity coordinates (x, y, z) to each of the proximity time measuring unit 110 and the display position calculation unit 120.

The display position calculation unit 120 calculates, on the basis of the information of the proximity coordinates (x, y, z) that are output from the proximity coordinates extraction unit 100, a position (x, y) on the touch panel 15 where to display a pointer PT, that is, a prearranged display position of a pointer PT (S16). Furthermore, the display position calculation unit 120 inquires of the display position correction unit 130 whether it is necessary to correct the prearranged display position of a pointer PT.

In response to the inquiry from the display position calculation unit 120, the display position correction unit 130 judges, by referring to the button defining information 12c2, whether or not a button is displayed within a prescribed distance of the position (x, y) on the touch panel 15 calculated by the display position calculation unit 120, that is, the prearranged display position of a pointer PT (S17). If judging that a button is displayed within the prescribed distance of the position (x, y) on the touch panel 15 calculated by the display position calculation unit 120, that is, the prearranged display position of a pointer PT (S17: yes), then the display position correction unit 130 judges whether the position (x, y) on the touch panel 15 calculated by the display position calculation unit 120, that is, the prearranged display position of a pointer PT, is a clear position that the user could easily judge visually or an unclear position (S18).

If judging that the prearranged display position of a pointer PT is a clear position that the user could easily judge visually (S18: yes), the display position correction unit 130 returns, as it is, to the display position calculation unit 120, the position (x, y) on the touch panel 15 calculated by the display position calculation unit 120, that is, the prearranged display position of a pointer PT. The display position calculation unit 120 tentatively employs, as a touch manipulation target button, the button that is displayed at the position (x, y) on the touch panel 15 returned from the display position correction unit 130, that is, the prearranged display position of a pointer PT (S20).

If judging that the prearranged display position of a pointer PT is an unclear position that the user could not easily judge visually (S18: no), the display position correction unit 130 corrects the position (x, y) on the touch panel 15 calculated by the display position calculation unit 120, that is, the prearranged display position of a pointer PT, by referring to the button defining information 12c2 (S19). In the correction of step S19, it is preferable that the prearranged display position of a pointer PT be corrected to a position that is close to the correction zone (see FIG. 5(a)) so that when a pointer PT is moved as a result of a hover manipulation of the user, the pointer movement seems as smooth as possible to the user. The display position correction unit 130 outputs a corrected prearranged display position (x', y') of a pointer PT to the display position calculation unit 120. The display position calculation unit 120 tentatively employs, as a touch manipulation target button, the button that is displayed at the corrected prearranged display position (x', y') of a pointer PT that is output from the display position correction unit 130 (S20).

If judging that no button is displayed within the prescribed distance of the position (x, y) on the touch panel 15 calculated by the display position calculation unit 120, that is, the prearranged display position of a pointer PT (S17: no), then the display position correction unit 130 judges whether or not a pointer PT is already displayed by referring to tentatively determined button information 12c1 stored in the memory 40 or the RAM 12b2 (S22). If no pointer PT is display yet (S22: no), the process of the input device 1 returns to step S13.

If judging that a pointer PT is already displayed (S22: yes), the display position correction unit 130 outputs, to the image combining unit 400, a pointer erasure request notice to the effect that the pointer PT should be erased. In FIG. 3, an arrow between the display position correction unit 130 and the image combining unit 400 is omitted.

The image combining unit 400 displays a pointer PT at the display position of the button that was tentatively determined at step S20 as a touch manipulation target button (S21). After displaying a pointer PT, the image combining unit 400 generates tentatively determined button information 12c1 indicating on what button the pointer PT has been displayed and stores it in the memory 40. As a result, the operation state managing unit 300 can judge whether or not a pointer PT is displayed on the display screen in the input device 1. In FIG. 3, an arrow between the image combining unit 400 and the memory 40 is omitted. After the execution of step S21, the process of the input device 1 returns to step S13.

The image combining unit 400 erases the pointer PT being displayed on the display screen on the basis of the point erasure request notice (S23). The pointer PT is erased from the display screen at step S23 because the finger has been moved from the display position of the already displayed pointer PT to a position that is irrelevant to the button concerned, that is, to reflect the fact that the user is no longer interested in the selection of the button indicated by the pointer PT. After the execution of step S23, the process of the input device 1 returns to step S13.

Next, assume that the touch coordinates extraction unit 200 has acquired, from the touch detection unit 20, a contact notice to the effect that the touch panel 15 has been touched by a finger (S13: yes). The touch coordinates extraction unit 200 outputs, to the operation state managing unit 300, the contact notice that is output from the touch detection unit 20. When acquiring the contact notice that is output from the touch coordinates extraction unit 200, the operation state managing unit 300 causes the input device 1 to make a transition from the "point display target selection state" to a "touch-manipulation-induced manipulation finalization state." The operation state managing unit 300 temporarily stores the information relating to the operation state of the input device 1 and the information of touch coordinates (x, y) in the memory 40 or the RAM 12b.

The "touch-manipulation-induced manipulation finalization state" means a state that a finalizing manipulation intended by the user has been made by a touch manipulation on the touch panel 15 by a finger. This also applies to the following embodiment.

The touch coordinates extraction unit 200 calculates and extracts touch coordinates (x, y) of the touch manipulation on the touch panel 15 by a finger on the basis of the contact notice that is output from the touch detection unit 20 (S24). The touch coordinates extraction unit 200 outputs the information of the touch coordinates (x, y) to the manipulation finalizing unit 210.

When acquiring the information of the touch coordinates (x, y) that are output from the touch coordinates extraction unit 200, the manipulation finalizing unit 210 inquires of the operation state managing unit 300 whether or not a pointer PT is already displayed in the input device 1 (S25). If acquiring, from the operation state managing unit 300, a pointer display notice to the effect that a pointer PT is already displayed (S25: yes), the manipulation finalizing unit 210 judges whether or not the touch coordinates (x, y) are within the detection range (see FIG. 6) of a button that is tentatively determined to be a touch manipulation target (S31).

If judging that the touch coordinates (x, y) are within the detection range (see FIG. 6) of the button that is tentatively determined to be a touch manipulation target (S31: yes), the manipulation finalizing unit 210 judges whether or not a touch manipulation with a quick downward movement of the finger in the vertical direction has been made on a button that is different from the button on which the pointer PT is displayed (S32).

If it is judged at step S32 that no such quick vertical finger movement has occurred (S32: no), the process of the input device 1 returns to step S13. In this case, the operation state managing unit 300 resets the current state, that is, the "touch-manipulation-induced manipulation finalization state," of the input device 1.

If it is judged at step S32 that such a quick vertical finger movement has occurred (S32: yes), the manipulation finalizing unit 210 finalizes, as a touch manipulation target, the button that is tentatively determined because of the current display of the pointer PT (S33). The manipulation finalizing unit 210 outputs, to the application 500, the information of the button that has been finalized as a touch manipulation target and the information of the touch coordinates (x, y). After the execution of step S33, the process of the input device 1 moves to step S28.

In the flowchart of FIG. 7, the manipulation finalizing unit 210 finalizes, as a touch manipulation target, the button that is tentatively determined because of the current display of the pointer PT only if it is judged at step S32 that a quick vertical finger movement (downward in the vertical direction) has occurred. However, even without a quick vertical finger movement, the manipulation finalizing unit 210 may finalize, as a touch manipulation target, the button that is tentatively determined because of the current display of the pointer PT if the continuation time of the touch of the touch panel 15 is long.

If the manipulation finalizing unit 210 judges that the touch coordinates (x, y) are not within the detection range (see FIG. 6) of the button that is tentatively determined to be a touch manipulation target (S31: no) or has not acquired, from the operation state managing unit 300, a pointer display notice to the effect that a pointer PT is already displayed (S25: no), then the manipulation finalizing unit 210 judges, on the basis of the touch coordinates (x, y) that are output from the touch coordinates extraction unit 200, whether or not a button for activating (executing) a prescribed process exists at the touch coordinates (x, y) of the finger on the touch panel 15 (S26).

If judging that a button for activating (executing) a prescribed process exists at the touch coordinates (x, y) of the finger on the touch panel 15 (S26: yes), the manipulation finalizing unit 210 finalizes, as a touch manipulation target, the button displayed at the position of the touch coordinates (x, y) (S27). The manipulation finalizing unit 210 outputs, to the application 500, the information of the button that has been finalized as a touch manipulation target and the information of the touch coordinates (x, y).

At step S28, the application 500 determines an operation (process) of itself according to the selected button on the basis of the information of the button and the information of the touch coordinates (x, y) that were output from the manipulation finalizing unit 210 at step S27 or S33. At step S29, the application 500 performs the operation determined at step S28. The description of the flowchart shown in FIG. 7 ends here.

On the other hand, if judging that no button for activating (executing) a prescribed process exists at the touch coordinates (x, y) of the finger on the touch panel 15 (S26: no), the manipulation finalizing unit 210 judges that the touch manipulation detected at step S13 is an invalid manipulation (S30). The description of the flowchart shown in FIG. 7 ends here.

As described above, when a user finger has been kept close to the touch panel 15 over it for more than the prescribed time TM, the input device 1 according to the embodiment displays a pointer PT if a button is displayed on the display screen under the finger in the vertical direction. If the pointer display position is located at a middle position between buttons or close to an edge of the button rather than well inside a button, the input device 1 corrects the pointer display position to, for example, an approximately central portion of a closest button. With this measure, the input device 1 displays a pointer PT so that it is moved discretely without causing the user to recognize a touch manipulation target button unclearly. Thus, the input device 1 allows the user to recognize a touch manipulation target button clearly.

Furthermore, in the state that the pointer PT is displayed, when a touch manipulation is performed in a prescribed detection range including a button range indicated by a displayed pointer PT, the input device 1 finalizes a manipulation target with a judgment that the button indicated by the pointer PT has been touch-manipulated even if touch coordinates (x, y) are located outside the button range. Still further, even if a touch manipulation with a quick vertical finger movement (downward in the vertical direction) has been made on a button that is different from a button indicated by a displayed pointer PT, the input device 1, the button that has been indicated by the pointer PT is finalized as a touch manipulation target.

Therefore, the input device 1 can efficiently select, according to a user input manipulation on the touch panel 15, an item (e.g., button) that is displayed on the screen so as to be able to receive a touch manipulation. Furthermore, the input device 1 allows the user to recognize a button on the display screen indicated by the fingertip in a state that a user finger is not in contact with the touch panel 15 but close to it, that is, the user finger is spaced from the touch panel 15 by a short distance. As a result, the input device 1 can give the user a comfortable manipulation feeling because the user can visually recognize, before a touch manipulation, a button that would be hidden by the user's own finger when he or she touch-manipulates it directly.

(Outline of Embodiment) 2

Figure 9:
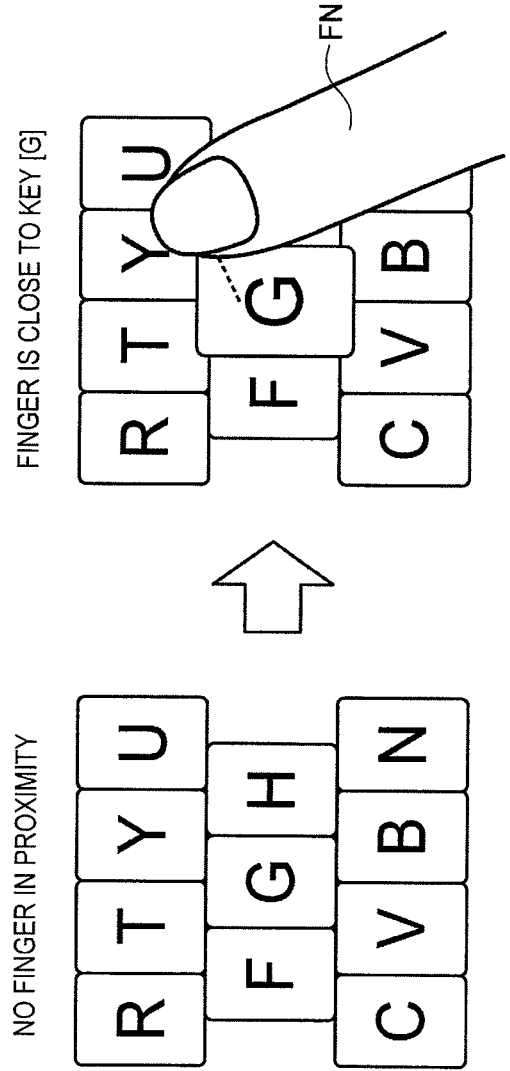
FIG. 9 is an explanatory diagram outlining a second embodiment.

A second embodiment will be outlined with reference to FIG. 9. FIG. 9 is explanatory diagrams outlining the second embodiment. Since the input device 1 according to the second embodiment is basically the same in configuration as the input device 1 shown in FIG. 3, in the second embodiment the individual units of input device 1 will be given the same reference symbols as in the first embodiment and redundant descriptions will thereby be avoided.

In the second embodiment, when detecting that a finger FN has come close to the touch panel 15 and the continuation time of the state that the finger FN is close to the touch panel 15 has exceeded a predetermined, prescribed time TM in a state that, for example, a keyboard including keys as plural buttons is displayed on the display screen, an input device 1 enlarges (displays in an enlarged manner) one key (e.g., [G] key) on the display screen under the finger FN in the vertical direction (see FIG. 9).

In this embodiment, the input device 1 enlarges, on the display screen DP, a button that has been determined tentatively as a user touch manipulation target. Furthermore, when a tentatively determined button is actually touched by a user touch manipulation in a state that the tentatively determined button is enlarged on the display screen DP, the input device 1 finalizes the tentatively determined button as a touch manipulation target and executes a process corresponding to the thus-finalized button.

For example, in the example of FIG. 9, if the enlarged [G] key is actually touched by the finger FN by a user touch manipulation, the input device 1 finalizes the [G] key as a touch manipulation target button and assist input through the [G] key.

(Key Display Ranges: Dedicated Display Range and Shared Display Range)

Figure 10:
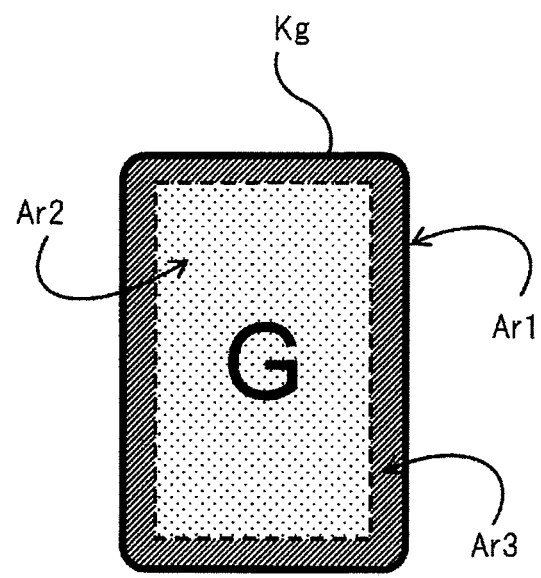
FIG. 10 is an explanatory diagram showing a dedicated display range and a shared display range of a [G] key.
Figure 11:
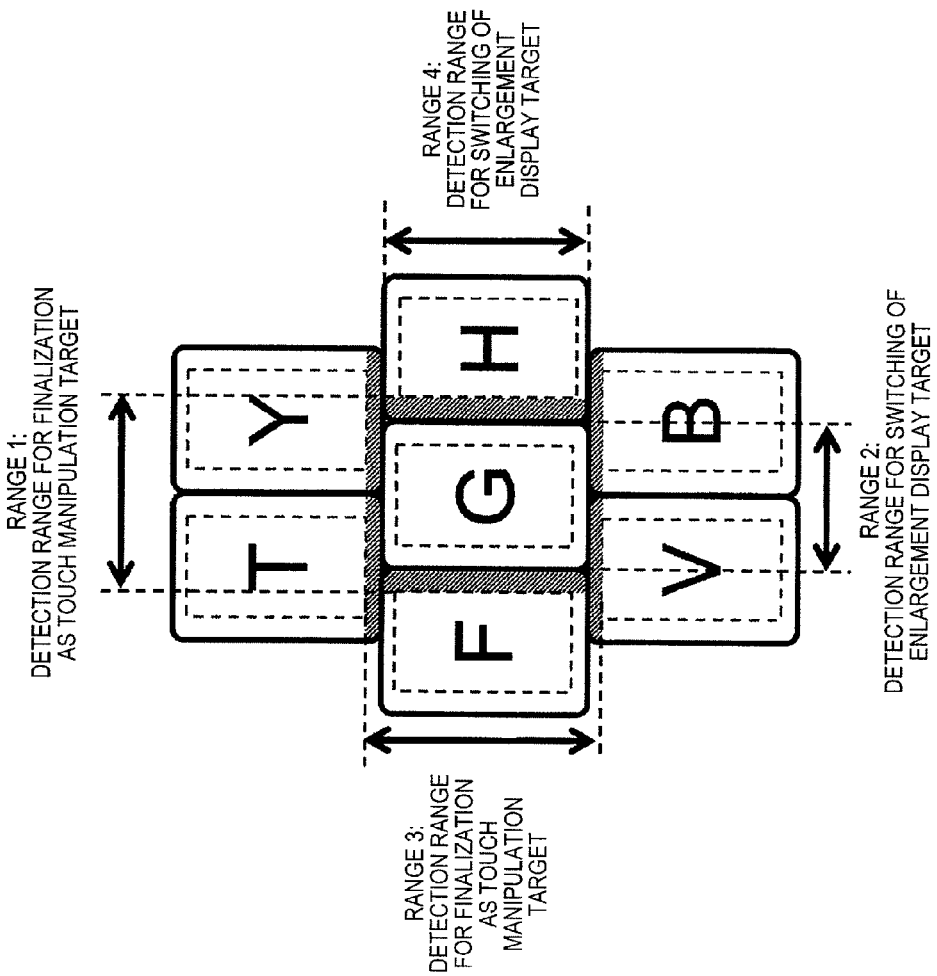
FIG. 11 is an explanatory diagram showing detection ranges for finalization as a touch manipulation target and detection ranges for switching of the enlargement target key in a case that keys are in contact with each other in the right-left direction and the top-bottom direction.

Next, a dedicated display range and a shared display range of a key in the second embodiment will be described with reference to FIGS. 10-12. FIG. 10 is an explanatory diagram showing a dedicated display range Ar2 and a shared display range Ar3 of a [G] key Kg. FIG. 11 is an explanatory diagram showing detection ranges for finalization as a touch manipulation target and detection ranges for switching of the enlargement target key in a case that keys are in contact with each other in the right-left direction and the top-bottom direction. FIG. 12(*a*) is an explanatory diagram showing a detection range for finalization as a touch manipulation target and a detection range for switching of the enlargement target key in a case that keys are spaced from each other in the right-left direction. FIG. 12(*b*) is an explanatory diagram showing a detection range for finalization as a touch manipulation target and a detection range for switching of the enlargement target key in a case that keys are spaced from each other in the top-bottom direction.

As shown in FIG. 10, a display range Ar1 of the [G] key Kg consists of the dedicated display range Ar2 and the shared display range Ar3.

The dedicated display range Ar2 is a display region that is maintained in a dedicated manner as a detection range of the self key even when another key that has been tentatively determined to be a touch manipulation target is enlarged so as to overlap with the self key. Therefore, the display of the dedicated display range Ar2 is continued even when another key that has been tentatively determined to be a touch manipulation target is enlarged so as to overlap with the self key.

The shared display range Ar3 is a display region that is rendered partially unseen being hidden by the other, enlarged key when another key that has been tentatively determined to be a touch manipulation target is enlarged so as to overlap with the self key. Therefore, when another key that has been tentatively determined to be a touch manipulation target is enlarged so as to overlap with the self key, part of the shared display range Ar3 is rendered unseen being hidden by the other, enlarged key.

The dedicated display range Ar2 and the shared display range Ar3 of the [G] key Kg will now be described in a specific manner with reference to FIG. 11. Referring to FIG. 11, as for detection of a proximity state that a finger is close to the [G] key Kg in the input device 1, the [G] key Kg is enlarged if a proximity state that a finger is over the display range Ar1 (see FIG. 10) of the [G] key Kg continues for more than a prescribed time TM. If a finger is moved out of the display range Ar1 of the [G] key Kg to within the display range Ar1 of an adjacent key (e.g., [H] key) after a proximity state of the finger was detected and the [G] key Kg was enlarged, the adjacent key (e.g., [H] key) is enlarged immediately.

Therefore, as shown in FIG. 11, a detection range Range 2, in the right-left direction, of the [G] key Kg for switching (changing) of the enlargement target key is equal to the length of the display range Ar1 of the [G] key Kg in the right-left direction. Likewise, a detection range Range 4, in the top-bottom direction, of the [G] key Kg for switching of the enlargement target key is equal to the length of the display range Ar1 of the [G] key Kg in the top-bottom direction.

A detection range Range 1, in the right-left direction, of the [G] key Kg for finalization as a touch manipulation target is equal to the sum of the length of the display range Ar1 of the [G] key Kg in the right-left direction and the lengths of the adjacent portions of the shared display ranges of the keys (in this example, [F] key and [H] key) adjacent to the [G] key Kg in the right-left direction, that is, the length of the right-hand portion (hatched) of the shared display range of the [F] key in the right-left direction and the length of the left-hand portion (hatched) of the shared display range of the [H] key in the right-left direction.

Likewise, a detection range Range 3, in the top-bottom direction, of the [G] key for a finalizing manipulation (touch manipulation) is equal to the sum of the length of the display range Ar1 of the [G] key Kg in the top-bottom direction and the lengths of the adjacent portions of the shared display ranges of the keys (in this example, [T] key and [V] key or [Y] key and [B] key) adjacent to the [G] key Kg in the top-bottom direction, that is, the length of the bottom portion (hatched) of the shared display range of the [T] key or [Y] key in the top-bottom direction and the length of the top portion (hatched) of the shared display range of the [V] key or [B] key in the top-bottom direction.

Next, the dedicated display range Ar2 and the shared display range Ar3 of the [G] key Kg will be described in more detail with reference to FIG. 12. Referring to FIGS. 12(a) and 12(b), as for detection of a proximity state that a finger is close to the [G] key Kg in the input device 1, the [G] key Kg is enlarged if a proximity state that a finger is over the display range Ar1 (see FIG. 10) of the [G] key Kg plus ranges (hatched) between the edges of the [G] key Kg and respective boundary lines MD1, MD2, MD3, and MD4 continues for more than the prescribed time TM. FIG. 12(a) shows the lengths, in the right-left direction, of the ranges (hatched) between the edges of the [G] key Kg and the boundary lines MD1 and MD2, respectively, and FIG. 12(b) shows the lengths, in the top-bottom direction, of the ranges (hatched) between the edges of the [G] key Kg and the boundary lines MD3 and MD4, respectively.

If a finger is moved out of the sum of the display range Ar1 of the [G] key Kg and the ranges between the edges of the [G] key Kg and the respective boundary lines MD1, MD2, MD3, and MD4 to within the sum of the display range Ar1 of an adjacent key (e.g., [H] key or [B] key) and the range (dotted) between the edge of the adjacent key and the boundary line MD1, MD2, MD3, or MD4 after a proximity state of the finger was detected and the [G] key Kg was enlarged, the adjacent key (e.g., [H] key or [B] key), rather than the [G] key Kg, is enlarged immediately. FIG. 12(a) shows the lengths, in the right-left direction, of the ranges (dotted) between the edges of each adjacent key and the boundary lines MD1 and MD2, respectively, and FIG. 12(b) shows the lengths, in the top-bottom direction, of the ranges (dotted) between the edges of each adjacent key and the boundary lines MD3 and MD4, respectively.

The boundary line MD1 indicates the middle position between the [F] key and the [G] key and the boundary between the detection ranges for switching of the enlargement target key. Likewise, the boundary line MD2 indicates the middle position between the [G] key and the [H] key and the boundary between the detection ranges for switching of the enlargement target key. The boundary line MD3 indicates the middle position between the [G] key and the [T] key or [Y] key and the boundary between the detection ranges for switching of the enlargement target key. The boundary line MD4 indicates the middle position between the [G] key and the [V] key or [B] key and the boundary between the detection ranges for switching of the enlargement target key.

Therefore, as shown in FIG. 12(a), a detection range Range 6, in the right-left direction, of the [G] key Kg for switching of the enlargement target key is equal to the sum of the length of the display range Ar1 of the [G] key Kg in the right-left direction, the length, in the right-left direction, of the range (hatched) between the right edge of the [G] key Kg and the boundary line MD2, and the length, in the right-left direction, of the range (hatched) between the left edge of the [G] key Kg and the boundary line MD1.

Figures 13A, 13B:
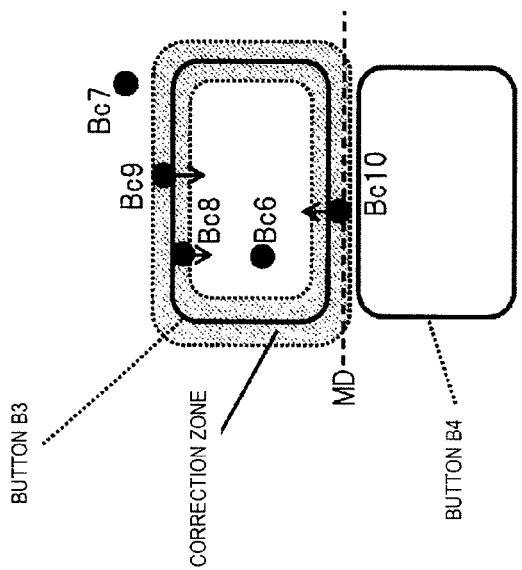
FIG. 13(a) is an explanatory diagram showing a positional relationship between a button and a correction zone that is set for the button.
FIG. 13(b) is an explanatory diagram showing five example cases in which it is judged whether the position on the touch panel under a finger in the vertical direction should be corrected or not.

Therefore, if the position under a finger in a proximity state in the vertical direction is a position P1 shown in FIG. 12(a), since the position P1 is inside the detection range Range 6 for switching of the enlargement target key, the [G] key Kg is employed as an enlargement target key (see FIGS. 13(a) and 13(b)). If the position under a finger in a proximity state in the vertical direction is a position P2 shown in FIG. 12(a), since the position P2 is outside the detection range Range 6 for switching of the enlargement target key, the [H] key is employed as an enlargement target key (see FIGS. 13(a) and 13(b)).

Likewise, as shown in FIG. 12(b), a detection range Range 8, in the top-bottom direction, of the [G] key Kg for switching of the enlargement target key is equal to the sum of the length of the display range Ar1 of the [G] key Kg in the top-bottom direction, the length, in the top-bottom direction, of the range (hatched) between the top edge of the [G] key Kg and the boundary line MD3, and the length, in the top-bottom direction, of the range (hatched) between the bottom edge of the [G] key Kg and the boundary line MD4.

Therefore, if the position under a finger in a proximity state in the vertical direction is a position P3 shown in FIG. 12(b), since the position P3 is inside the detection range Range 8 for switching of the enlargement target key, the [G] key Kg is employed as an enlargement target key (see FIGS. 13(a) and 13(b)). If the position under a finger in a proximity state in the vertical direction is a position P4 shown in FIG. 12(b), since the position P4 is outside the detection range Range 8 for switching of the enlargement target key, the [T] key is employed as an enlargement target key (see FIGS. 13(a) and 13(b)).

As shown in FIG. 12(a), a detection range Range 5, in the right-left direction, for finalization of the [G] key as a touch manipulation target is the sum of the length of the display range Ar1 of the [G] key Kg in the right-left direction, the distance between the left edge of the [G] key and the right edge of the [F] key which is adjacent to the [G] key Kg from the left side, the length, in the right-left direction, of the right-hand portion (hatched in the opposite direction) of the shared display range Ar3 of the [F] key, the distance between the right edge of the [G] key and the right edge of the [H] key which is adjacent to the [G] key Kg from the right side, and the length, in the right-left direction, of the left-hand portion (hatched in the opposite direction) of the shared display range Ar3 of the [H] key.

As shown in FIG. 12(b), a detection range Range 7, in the top-bottom direction, for finalization of the [G] key as a touch manipulation target is the sum of the length of the display range Ar1 of the [G] key Kg in the top-bottom direction, the distance between the top edge of the [G] key and the bottom edge of the [T] key or [Y] key which is adjacent to the [G] key Kg from the top side, the length, in the top-bottom direction, of the bottom portion (hatched in the opposite direction) of the shared display range Ar3 of the [T] key of [Y] key, the distance between the bottom edge of the [G] key and the top edge of the [V] key or [B] key which is adjacent to the [G] key Kg from the bottom side, and the length, in the top-bottom direction, of the top portion (hatched in the opposite direction) of the shared display range Ar3 of the [V] key [B] key.

The information of the above-described detection ranges Range 1 to Range 8 is stored as part of the button defining information 12c2 so as to be correlated with the respective buttons (keys).

How the display position correction unit 130 corrects the position under a finger being in a proximity state in the vertical direction will be described with reference to FIGS. 13(a) and 13(b). FIG. 13(a) is an explanatory diagram showing a positional relationship between a button and a correction zone that is set for the button. FIG. 13(b) is an explanatory diagram showing five example cases in which it is judged whether the position on the touch panel under a finger in the vertical direction should be corrected or not. FIG. 13(a) shows an example in which a button B3 (above) and a button B4 (below) are displayed adjacent to each other. FIG. 13(a) shows a correction zone (hatched) of the button B3.

As for whether the display position correction unit 130 should correct the position under a finger being in a proximity state in the vertical direction, five cases Bc6, Bc7, Bc8, Bc9, and Bc10, for example, are conceivable one of which is satisfied by the position under a finger being in a proximity state in the vertical direction. FIG. 13(a) shows positions under a finger being in a proximity state in the vertical direction which correspond to the five respective cases. FIG. 13(b) shows, for each case, whether or not the display position correction unit 130 should correct the position under a finger being in a proximity state in the vertical direction and whether or not the display position calculation unit 120 should tentatively determine the button concerned as a touch manipulation target button.

In the first case Bc6, since the position under the finger being in a proximity state in the vertical direction is apparently inside the button B3, the position under the finger being in the proximity state in the vertical direction would clearly indicate the button B3. Therefore, the display position correction unit 130 does not perform correction and the display position calculation unit 120 makes tentative determination.

In the second case Bc7, since the position under the finger being in a proximity state in the vertical direction is apparently outside the button B1, it is apparent that the button B3 does not exist within a prescribed distance of the position under the finger being in the proximity state in the vertical direction. Therefore, the display position correction unit 130 does not perform correction and the display position calculation unit 120 does not make tentative determination.

In the third case Bc8, although the position under the finger being in a proximity state in the vertical direction is inside the button B3 and the correction zone, in this embodiment the button displayed at the position under the finger being in the proximity state in the vertical direction is made an enlargement target. Since the button B3 is made an enlargement target though the position under the finger being in the proximity state in the vertical direction is inside the correction zone, whether correction is performed or not would not directly influence the tentative determination of an enlargement target button. Therefore, in the case Bc8, the display position correction unit 130 may either perform or not perform correction and the display position calculation unit 120 makes tentative determination.

In the fourth case Bc9, the position under the finger being in a proximity state in the vertical direction is outside the button B3 and inside the correction zone and no adjacent button exist. Since the position under the finger being in the proximity state in the vertical direction is outside the button B1 but no adjacent button exists, it would be necessary to cause the user to clearly recognize that the closest button B3 is a touch manipulation target. Therefore, in the case Bc9, the display position correction unit 130 corrects the position under the finger being in the proximity state in the vertical direction inward in the button B3 and the display position calculation unit 120 tentatively employs the button B3 as an enlargement target button.

In the fifth case Bc10, since the position under the finger being in a proximity state in the vertical direction is outside the button B3 and inside the correction zone and an adjacent button B4 exists, it would be necessary that the position under the finger being in the proximity state in the vertical direction be able to cause the user to clearly recognize whether he or she is going to manipulate the button B1 or the button B2. Therefore, in the case Bc10, the display position correction unit 130 corrects the position under the finger being in the proximity state in the vertical direction so that it will be located inside the button B3 and the display position calculation unit 120 tentatively employs the button B3 as an enlargement target button.

(Flowchart of Embodiment) 2

Figure 14:
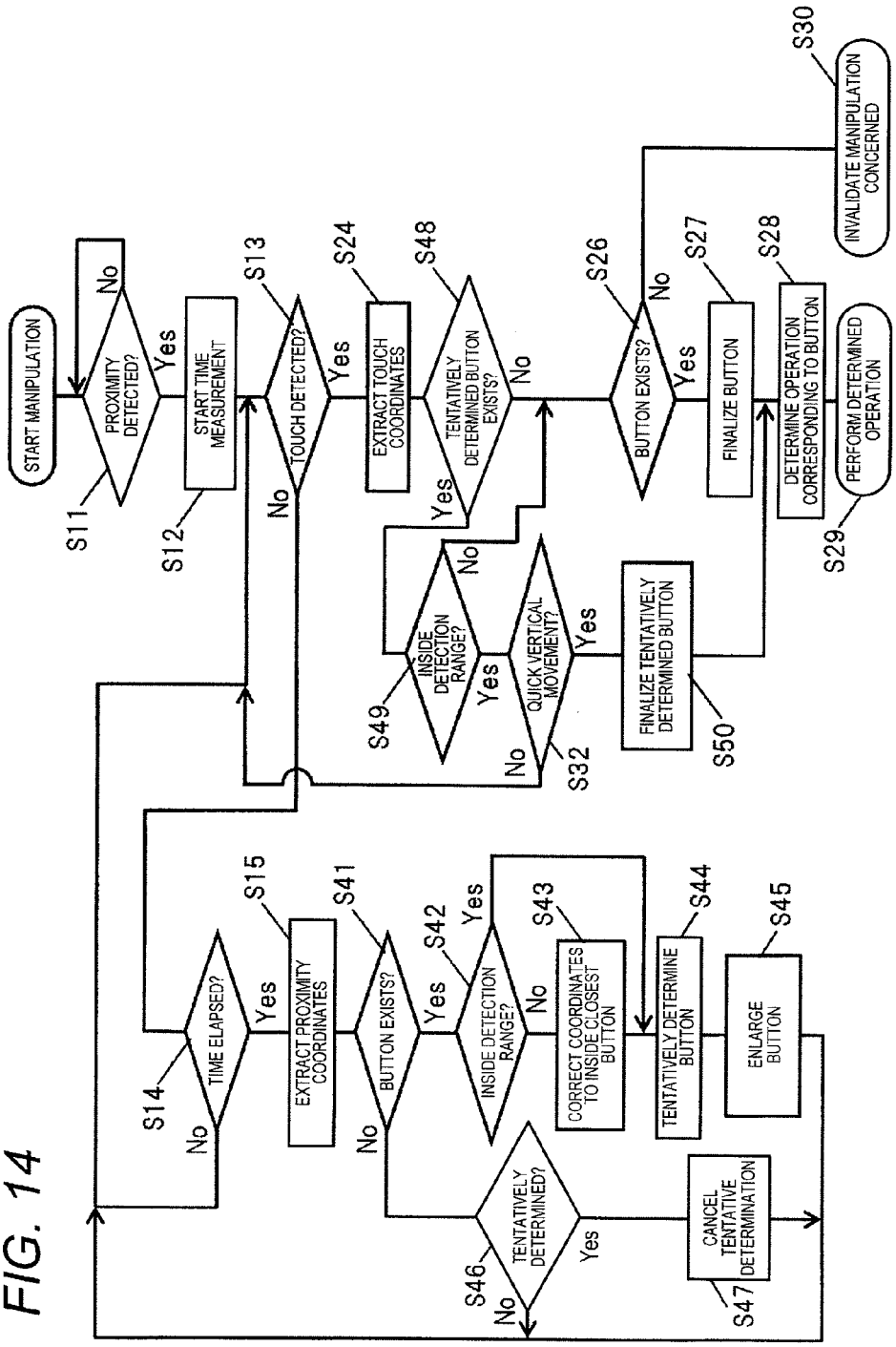
FIG. 14 is a flowchart showing how the input device according to the second embodiment operates.
Figure 15A:
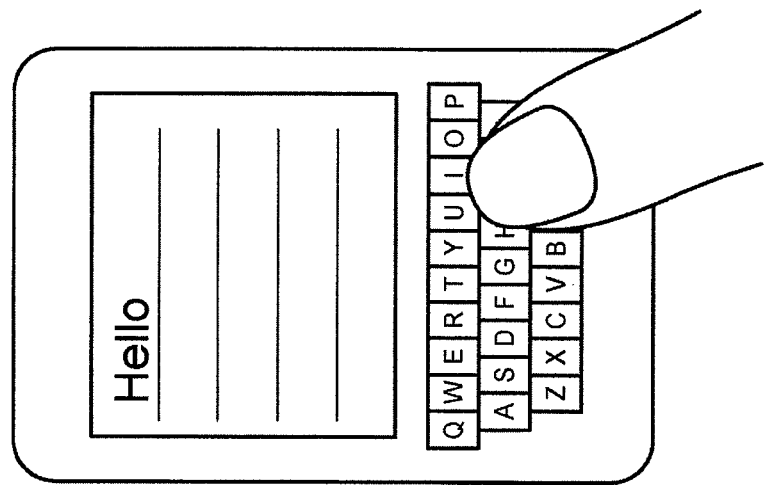
FIG. 15(a) shows lists of news headlines displayed on the screen of an electronic device incorporating a touch panel.
Figure 15B:
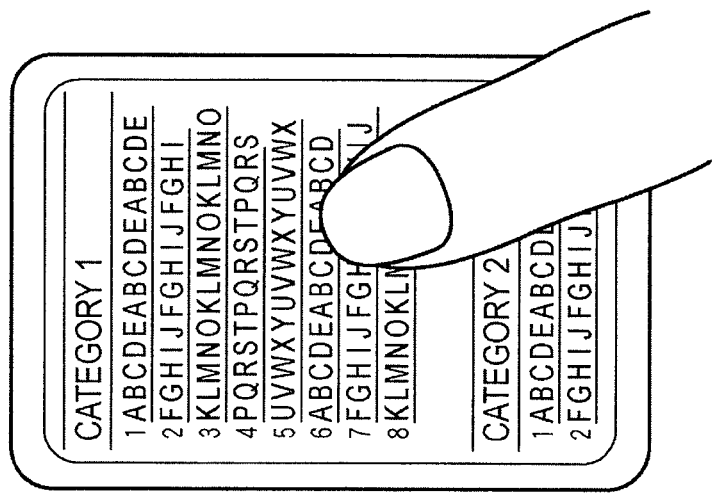
FIG. 15(b) shows how characters are input through the screen of the electronic device incorporating the touch panel.

Next, how the input device 1 according to the second embodiment operates will be described with reference to FIG. 14. FIG. 14 is a flowchart showing how the input device 1 according to the second embodiment operates. The flowchart of FIG. 14 shows how the input device 1 operates when a user who manipulates the input device 1 inputs a manipulation on the input device 1 using his or her own finger. Steps shown in the flowchart of FIG. 14 having the same ones in the flowchart of FIG. 8 are given the same symbols as the latter and descriptions therefor will be omitted. In the following description, the term "button" may be read as a specific term "key" (see FIGS. 10-12).

Referring to FIG. 14, if judging that the elapsed time from coming into proximity of a finger to the touch panel 15 is longer than a prescribed time TM (S14: yes), the proximity time measuring unit 110 generates a proximity coordinates extraction instruction to extract proximity coordinates (x, y, z) and outputs it to the proximity coordinates extraction unit 100. And the proximity time measuring unit 110 outputs, to the operation state managing unit 300, a state transition notice to the effect that a transition to an "enlargement target selection state" of the input device 1 should be made. The operation state managing unit 300 changes the operation state of the input device 1 to the "enlargement target selection state."

Once the elapsed time from coming into proximity of a finger to the touch panel 15 has become longer than the prescribed time TM and a finger proximity state has thereby been detected, it is preferable that execution of step S14 be omitted as long as the finger proximity state is maintained. With this measure, in the input device 1, if the finger is moved to another button after a finger proximity state was detected and has been maintained, the movement destination button can be enlarged immediately. Thus, the user can enjoy a stress-free manipulation feeling.

The proximity coordinates extraction unit 100 calculates and extracts proximity coordinates (x, y, z) of the finger on (with respect to) the touch panel 15 in response to the proximity coordinates extraction instruction that is output from the proximity time measuring unit 110 (S15). The proximity coordinates extraction unit 100 outputs the information of the extracted proximity coordinates (x, y, z) to each of the proximity time measuring unit 110 and the display position calculation unit 120.

The display position calculation unit 120 calculates, on the basis of the information of the proximity coordinates (x, y, z) that are output from the proximity coordinates extraction unit 100, a position (x, y) on the touch panel 15 of an item (e.g., button) to become an enlargement target, that is, a position of the position under the finger being in the proximity state in the vertical direction. Furthermore, the display position calculation unit 120 inquires of the display position correction unit 130 whether it is necessary to correct the position under the finger being in the proximity state in the vertical direction (S41).

In response to the inquiry from the display position calculation unit 120, the display position correction unit 130 judges, by referring to the button defining information 12c2, whether or not a button is displayed within a prescribed distance of the position (x, y) on the touch panel 15 calculated by the display position calculation unit 120, that is, the position under the finger being in the proximity state in the vertical direction (S41). If judging that a button is displayed within the prescribed distance of the position (x, y) on the touch panel 15 calculated by the display position calculation unit 120, that is, the position under the finger being in the proximity state in the vertical direction (S41: yes), then the display position correction unit 130 judges whether the position (x, y) on the touch panel 15 calculated by the display position calculation unit 120, that is, the position under the finger being in the proximity state in the vertical direction, is inside the detection range for switching of the enlargement target button (S42). The detection range for switching of the enlargement target button is the range defined by the ranges Range 2 and Range 4 shown in FIG. 10 or the ranges Range 6 and Range 8 shown in FIGS. 11(a) and 11(b).

If judging that the position (x, y) on the touch panel 15 calculated by the display position calculation unit 120, that is, the position under the finger being in the proximity state in the vertical direction, is inside the detection range for switching of the enlargement target button (S42: yes), the display position correction unit 130 outputs the information of the button and the information of the position (x, y) on the touch panel 15 to the display position calculation unit 120 without switching the enlargement target button. The display position calculation unit 120 tentatively employs, as a button to be finalized as a touch manipulation target, the button corresponding to the information that is output from the display position correction unit 130 on the basis of the information of the button and the information of the position (x, y) on the touch panel 15 that are output from the display position correction unit 130 (S44).

If judging that the position (x, y) on the touch panel 15 calculated by the display position calculation unit 120 is outside the detection range for switching of the enlargement target button (S42: no), the display position correction unit 130 corrects the position under the finger being in the proximity state in the vertical direction to inside a button that is closest to that position by referring to the button defining information 12c2 (S43; see FIG. 13(a)). The display position calculation unit 120 tentatively employs, as a button to be finalized as a touch manipulation target, the button corresponding to the corrected position under the finger being in the proximity state in the vertical direction by referring to the button defining information 12c2 (S44).

If judging that no button is displayed within the prescribed distance of the position (x, y) on the touch panel 15 calculated by the display position calculation unit 120, that is, the position under the finger being in the proximity state in the vertical direction (S41: no), then the display position correction unit 130 judges whether or not a tentatively determined button exists by referring to the memory 40 or the RAM 12b2 (S46). If it is judged that no tentatively determined button exists (S46: no), the process of the input device 1 returns to step S13.

If judging that a tentatively determined button exists (S46: yes), the display position correction unit 130 outputs, to the operation state managing unit 300, a tentative determination cancellation request notice to the effect that the tentative determination of the touch manipulation target should be canceled.

The operation state managing unit 300 cancels the tentative determination of the button to be finalized as a touch manipulation target on the basis of the tentative determination request notice (S47), and outputs, to the image generation unit 420, an enlargement cancellation request notice to the effect that the button that is enlarged on the display screen should be returned to the state before the enlargement.

The image generation unit 420 generates enlarged image data of the button that was tentatively determined to be a button to be finalized as a touch manipulation target at step S44. The size of the enlarged image data is prescribed in advance as part of the operation particulars of the image generation unit 420 and, for example, is determined by the finalizing manipulation detection ranges Range 1 and Range 3 (see FIG. 10) or Range 5 and Range 7 (see FIG. 11).

The image generation unit 420 outputs the generated enlarged image data to the image combining unit 400. The image combining unit 400 generates combined image data in which the button that was tentatively determined at step S44 is enlarged in a screen of the application 500 using screen data that is output from the application screen generation unit 410 and the enlarged image data, and displays it on the image display unit 30 (S44).

After enlargement-displaying the button that was tentatively determined at step S44, the image combining unit 400 generates tentatively determined button information 12c1 indicating what button has been enlarged to store in the memory 40. As a result, the operation state managing unit 300 can judge what button has been enlarged and become a finalization target button (touch manipulation target button) in the input device 1. After the execution of step S44, the process of the input device 1 returns to step S13.

The image generation unit 420 generates image data in which the size of the button that is currently enlarged on the display screen is returned to the size before the enlargement on the basis of the enlargement cancellation request notice that is output from the operation state managing unit 300, and outputs it to the image combining unit 400. The image combining unit 400 displays the image data that is output from the image generation unit 420 on the image display unit. Displaying, in the size before the enlargement, at step S47, the button that has been enlarged so far is done because the finger has already been moved to a position that is irrelevant to the button that has been tentatively determined to be a touch manipulation target and thereby enlarged, that is, to reflect the fact that the user is no longer interested in the selection of the button has been enlarged. After the execution of step S47, the process of the input device 1 returns to step S13.

On the other hand, at step S48, when acquiring the information of touch coordinates (x, y) that are output from the touch coordinates extraction unit 200, the manipulation finalizing unit 210 inquires of the operation state managing unit 300 whether or not there exists a button that is tentatively determined to be button to be finalized as a touch manipulation target in the input device 1 (S48). The operation state managing unit 300 judges whether or not there exists a button that is tentatively determined to be a button to be finalized as a touch manipulation target in the input device 1 by referring to the memory 40 or the RAM 12b, and output a judgment result to the manipulation finalizing unit 210. If it is judged that there is no button that is tentatively determined to be button to be finalized as a touch manipulation target in the input device 1 (S48: no), the same steps as steps S26-S30 shown in FIG. 7 are executed, descriptions of which are omitted.

If acquiring, from the operation state managing unit 300, a judgment result to the effect that there exists a button that is tentatively determined to be button to be finalized as a touch manipulation target (S48: yes), the manipulation finalizing unit 210 judges whether or not the touch coordinates (x, y) are inside the detection range of a finalizing manipulation on the tentatively determined button (S49). The detection range of a finalizing manipulation for a tentatively determined button is the range that is determined by the ranges Range 1 and Range 3 shown in FIG. 10 or the ranges Range 5 and Range 7 shown in FIGS. 11(a) and 11(b).

If judging that the touch coordinates (x, y) are within the detection range of a finalizing manipulation on the tentatively determined button (S49: yes), the manipulation finalizing unit 210 judges whether or not a touch manipulation with a quick downward movement of the finger in the vertical direction has been made on a button that is different from the tentatively determined button (S32).

If it is judged that the touch coordinates (x, y) are not within the detection range of a finalizing manipulation on the tentatively determined button (S49: no), the same steps as steps S26-S30 shown in FIG. 7 are executed, descriptions of which are omitted.

If it is judged at step S32 that no such quick vertical finger movement has occurred (S32: no), the process of the input device 1 returns to step S13. In this case, the operation state managing unit 300 resets the current state, that is, the "touch-manipulation-induced manipulation finalization state," of the input device 1.

If it is judged at step S32 that such a quick vertical finger movement has occurred (S32: yes), the manipulation finalizing unit 210 finalizes, as a touch manipulation target, the tentatively determined button (S50). The steps to be executed after step S50 are the same as steps S28-S30 shown in FIG. 7, and hence descriptions therefor are omitted.

As described above, when a user finger has been kept close to the touch panel 15 over it for more than the prescribed time TM, if a button is displayed on the display screen under the finger in the vertical direction, the input device 1 according to this embodiment tentatively determines the button to be a button to be finalized as a touch manipulation target and enlarges the button on the display screen. If the position (x, y) on the touch panel 15 under a finger being in a proximity state in the vertical direction is located outside the detection rage of a button, that is, the detection range for switching of an enlargement target button, the input device 1 switches the button to be finalized as a touch manipulation target by referring to the information of the position (x, y) on the touch panel 15 and the button defining information 12c2. With this measure, the input device 1 enlargement-displays a button is tentatively determined to be a button to be finalized as a touch manipulation target without causing the user to recognize the touch manipulation target button unclearly. Thus, the input device 1 allows the user to recognize a touch manipulation target (candidate) button clearly and to perform a touch manipulation without making an erroneous manipulation.

Therefore, the input device 1 can efficiently select, according to a user input manipulation on the touch panel 15, an item (e.g., a button such as a keyboard key) that is displayed on the screen so as to be able to receive a touch manipulation. Furthermore, the input device 1 allows the user to recognize a button on the display screen indicated by the fingertip in a state that a user finger is not in contact with the touch panel 15 but close to it, that is, the user finger is spaced from the touch panel 15 by a short distance. As a result, the input device 1 can give the user a comfortable manipulation feeling because the user can visually recognize, before a touch manipulation, a button that would be hidden by the user's own finger when he or she touch-manipulates it directly.

Although the various embodiments have been described above with reference to the drawings, it goes without saying that the invention is not limited to those examples. It is apparent that those skilled in the art would conceive changes or modifications of the various embodiments or combinations of the various embodiments within the confines of the claims. And such changes, modifications, or combinations should naturally be included in the technical scope of the invention.

In the above-described first embodiment, the input device 1 may display a pointer PT in such a manner it is flashed. With this measure, the input device 1 can cause a button to be finalized as a touch manipulation target to attract more attention of the user.

In the above-described first embodiment, the input device 1 may display a pointer PT at a prearranged display position of a pointer PT even if no item (e.g., button) capable of receiving a touch manipulation is displayed at the prearranged display position of a pointer PT. With this measure, the input device 1 allows the user to recognize that no touch manipulation target item (e.g., button) exists at the position on the touch panel 15 under a finger in the vertical direction and can thereby urge the user to move the finger to a position where the item is displayed.

The present application is based on Japanese Patent Application No. 2012-054920 filed on Mar. 12, 2012, the disclosure of which is incorporated herein by reference.

INDUSTRIAL APPLICABILITY

The invention is useful when applied to input device, input assistance methods, and programs for assistance efficient selection from items displayed on the screen in a touch manipulation receivable manner in response to a user input manipulation on a touch panel.

DESCRIPTION OF REFERENCE SIGNS

1: Input Device
10: Proximity Detection Unit
20: Touch Detection Unit
30: Screen Display Unit
100: Proximity Coordinates Extraction Unit
110: Proximity Time Measuring Unit
120: Display Position Calculation Unit
130: Display Position Correction Unit
200: Touch Coordinates Extraction Unit
210: Manipulation Finalizing Unit
300: Operation State Managing Unit
400: Image Combining Unit
410: Application Screen Generation Unit
420: Image Generation Unit
500: Application

The invention claimed is:

1. An input apparatus comprising:
a display capable of displaying an item;
a detector configured to detect contactless proximity of an object to the display at first coordinates of the object along a plane of the display, and contact of the object with the display at second coordinates of the object along the plane of the display,
wherein, when the contactless proximity of the object is detected, and the first coordinates of the object are located within a first distance in the plane of the display from the item, the item is temporarily selected,
after the item has been selected temporarily, when the contact of the object is detected, and the second coordinates of the object are located on the item, the item is finally selected,
after the item has been selected temporarily, when the contact of the object is detected, and the second coordinates of the object are located within a second distance in the plane of the display from the item, the item is finally selected, and wherein the second distance in the plane of the display from the item is longer than the first distance in the plane of the display from the item.

2. The input apparatus according to claim 1, wherein after the item has been temporarily selected, when the object approaches the display at a prescribed speed, and then the contact of the object is detected at the second coordinates of the object located within the second distance in the plane of the display from the item, the item is finally selected.

3. The input apparatus according to claim 1,
wherein, when the item is temporarily selected, the item is enlarged on the display.

4. The input apparatus according to claim 1,
wherein the detector comprises a touch panel overlapping the display.

5. The input apparatus according to claim 1,
wherein the object comprises a finger of an user.

6. The input apparatus according to claim 1,
wherein the item comprises an icon.

7. The input apparatus according to claim 6,
wherein the icon comprises a button to be selected.

8. The input apparatus according to claim 6,
wherein the icon includes at least a character on the display.

9. The input apparatus according to claim 8,
wherein, when the item is finally selected, the input apparatus receives an input of the character.

10. The input apparatus according to claim 1,
wherein, when the contactless proximity of the object is detected, the contact of the object with the display is not detected, and the first coordinates of the object are located within the first distance in the plane of display from the item, the item is temporarily selected.

11. An input method for an input apparatus comprising a display capable of displaying an item; a detector configured to detect contactless proximity of an object to the display at first coordinates of the object along a plane of the display, and contact of the object to the display with second coordinates of the object along the plane of the display,
wherein, in response to detection of the contactless proximity of the object, and in response to detection of the first coordinates of the object being located within a first distance in the plane of the display from the item, the item is temporarily selected,
after the item has been temporarily selected, in response to detection of the contact of the object, and in response to detection of the second coordinates of the object being located on the item, the item is finally selected,
after the item has been temporarily selected, in response to detection of the contact of the object, and in response to detection of the second coordinates of the object being located within a second distance in the plane of the display from the item, the item is finally selected, and
wherein the second distance in the plane of the display from the item is longer than the first distance in the plane of the display from the item.

12. The input method according to claim 11, wherein after the item has been temporarily selected, in response to detection of the object approaching the display at a prescribed speed, and then the contact of the object at the second coordinates of the object located within the second distance in the plane of the display from the item, the item is finally selected.

13. The input method according to claim 11,
wherein, in response to the item being temporarily selected, the item is enlarged on the display.

14. The input method according to claim 11,
wherein the detector comprises a touch panel overlapping the display.

15. The input method according to claim 11,
wherein the object comprises a finger of an user.

16. The input method according to claim 11,
wherein the item comprises an icon.

17. The input method according to claim 16,
wherein the icon comprises a button to be selected.

18. The input method according to claim 16,
wherein the icon includes at least a character on the display.

19. The input method according to claim 18,
wherein, in response to the item being finally selected, the input apparatus receives an input of the character.

20. The input apparatus according to claim 11,
wherein, in response to detection of the contactless proximity of the object, non-detection of the contact of the object with the display, and detection of the first coordinates of the object being located within the first distance in the plane of display from the item, the item is temporarily selected.

* * * * *